(12) United States Patent
Wang et al.

(10) Patent No.: US 12,375,236 B2
(45) Date of Patent: Jul. 29, 2025

(54) LOW COMPLEXITY MACHINE LEARNING BASED CHANNEL CLASSIFIER

(71) Applicant: Samsung Electronics Co., Ltd., Suwon-si (KR)

(72) Inventors: Tiexing Wang, Plano, TX (US); Yeqing Hu, Allen, TX (US); Yang Li, Plano, TX (US); Rui Wang, San Jose, CA (US); Junmo Sung, Richardson, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 17/932,274

(22) Filed: Sep. 14, 2022

(65) Prior Publication Data

US 2023/0082795 A1    Mar. 16, 2023

Related U.S. Application Data

(60) Provisional application No. 63/244,493, filed on Sep. 15, 2021.

(51) Int. Cl.
| | | |
|---|---|---|
| *H04L 49/90* | (2022.01) | |
| *H04L 5/00* | (2006.01) | |
| *H04L 25/02* | (2006.01) | |
| *H04L 27/26* | (2006.01) | |

(52) U.S. Cl.
CPC ........ *H04L 5/0048* (2013.01); *H04L 25/0224* (2013.01); *H04L 27/265* (2013.01)

(58) Field of Classification Search
USPC ....................................................... 370/252
See application file for complete search history.

(56) References Cited

U.S. PATENT DOCUMENTS

| | | |
|---|---|---|
| 8,644,181 B2 | 2/2014 | Zhao et al. |
| 10,263,745 B2 | 4/2019 | Soriaga et al. |
| 2018/0074209 A1* | 3/2018 | Madhow ................. G01S 19/11 |
| 2021/0242999 A1 | 8/2021 | Baskaran et al. |
| 2021/0399855 A1 | 12/2021 | Davydov et al. |
| 2022/0077942 A1 | 3/2022 | Chervyakov et al. |
| 2022/0078649 A1 | 3/2022 | Chen et al. |
| 2024/0396766 A1* | 11/2024 | Jeong ................... G06N 3/0475 |

FOREIGN PATENT DOCUMENTS

CN    114915368 B  *  8/2023

OTHER PUBLICATIONS

Davide et al. (Machine learning based LOS/NLOS classifier and robust estimator for GNSS shadow matching) (Year: 2020).*

* cited by examiner

*Primary Examiner* — Maharishi V Khirodhar

(57) ABSTRACT

A method includes storing multiple signals received from a user equipment (UE) in a queue. The method also includes estimating a sounding reference signal (SRS) signal-to-noise-ratio (SNR) and determining a filtered SNR based on the received signals. The method also includes computing one or more features based on the filtered SNR and at least some of the received signals in the queue. The method also includes determining (i) a channel condition of the UE and (ii) a speed range of the UE based on the one or more computed features, wherein the channel condition of the UE comprises line-of-sight (LoS) or non-line-of-sight (NLoS). The method also includes determining a transmission configuration based on the channel condition of the UE and the speed range of the UE.

20 Claims, 18 Drawing Sheets

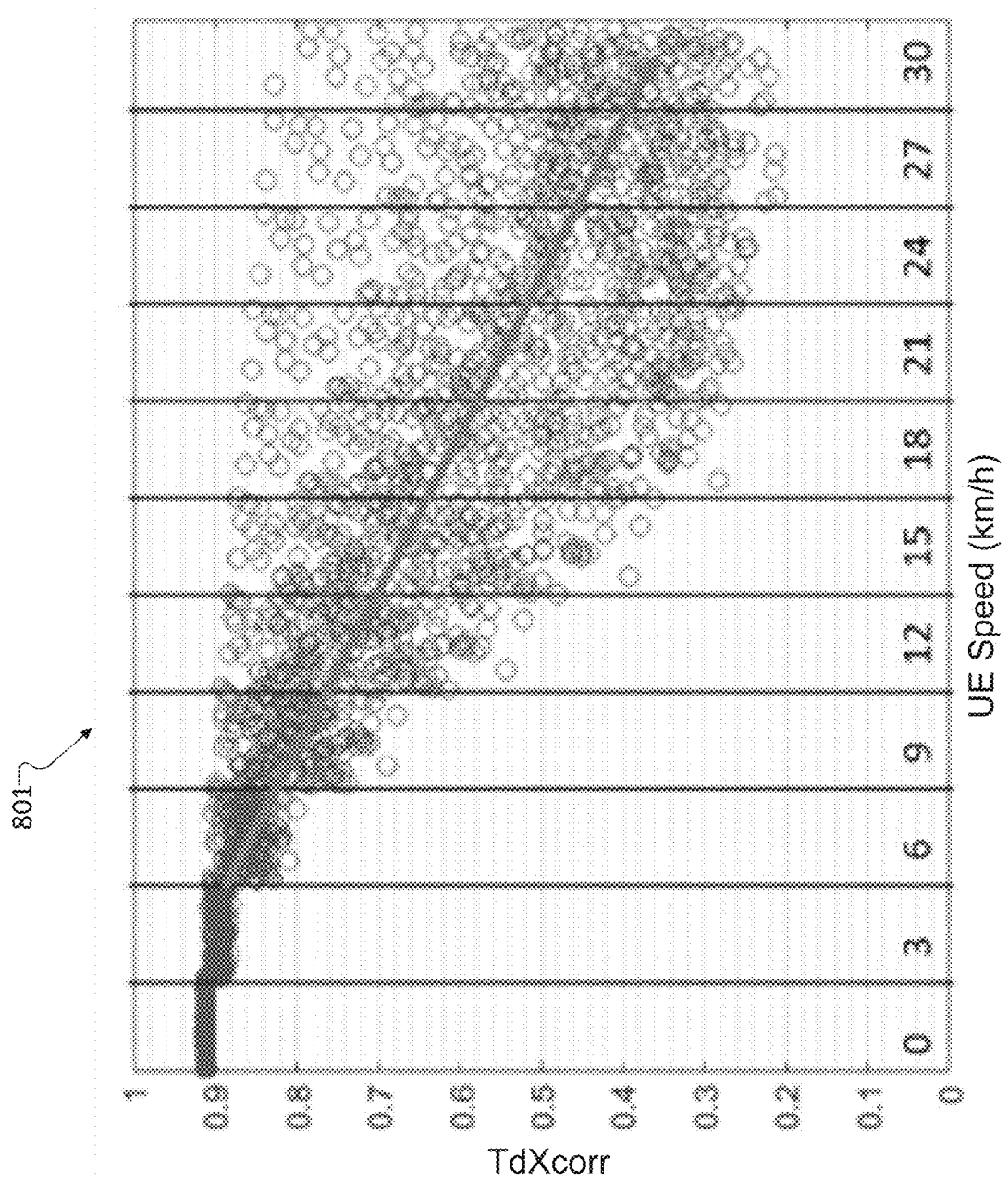

LOW COMPLEXITY MACHINE LEARNING BASED CHANNEL CLASSIFIER

CROSS-REFERENCE TO RELATED APPLICATIONS AND CLAIM OF PRIORITY

The present application claims priority to U.S. Provisional Patent Application Ser. No. 63/244,493 filed on Sep. 15, 2021. The content of the above-identified patent document is incorporated herein by reference.

TECHNICAL FIELD

The present disclosure relates generally to wireless communication systems and, more specifically, the present disclosure relates to a low complexity machine learning based radio channel classifier.

BACKGROUND

Many features in noise reduction require knowledge about different characteristics of the radio channel. This may include rough knowledge of path loss for transmit power control, spatial information for channel state-information reference signals (CSI-RS) transmissions, precise channel responses for multi-user multiple-input-multiple-output (MU-MIMO) precoding, and the like. Furthermore, optimal selection and configuration of these schemes may also depend on a certain level of knowledge of the channel. For example, MU-MIMO is more sensitive to user equipment (UE) mobility than single-user MIMO (SU-MIMO); thus, by knowing a speed range of the UE, the gNB may decide an optimal transmission scheme to apply.

SUMMARY

The present disclosure relates to wireless communication systems and, more specifically, the present disclosure relates to a low complexity machine learning based channel classifier.

In one embodiment, a method includes storing multiple signals received from a user equipment (UE) in a queue. The method also includes estimating a sounding reference signal (SRS) signal-to-noise-ratio (SNR) and determining a filtered SNR based on the received signals. The method also includes computing one or more features based on the filtered SNR and at least some of the received signals in the queue. The method also includes determining (i) a channel condition of the UE and (ii) a speed range of the UE based on the one or more computed features, wherein the channel condition of the UE comprises line-of-sight (LoS) or non-line-of-sight (NLoS). The method also includes determining a transmission configuration based on the channel condition of the UE and the speed range of the UE.

In another embodiment, a device includes a transceiver configured to receive multiple signals from a UE. The device also includes a processor operably connected to the transceiver. The processor is configured to: store the received signals in a queue; estimate a SRS SNR and determine a filtered SNR based on the received signals; compute one or more features based on the filtered SNR and at least some of the received signals in the queue; determine (i) a channel condition of the UE and (ii) a speed range of the UE based on the one or more computed features, wherein the channel condition of the UE comprises LoS or NLoS; and determine a transmission configuration based on the channel condition of the UE and the speed range of the UE.

In yet another embodiment, a non-transitory computer readable medium includes program code that, when executed by a processor of a device, causes the device to: control a transceiver to receive multiple signals from a UE; store the received signals in a queue; estimate a SRS SNR and determine a filtered SNR based on the received signals; compute one or more features based on the filtered SNR and at least some of the received signals in the queue; determine (i) a channel condition of the UE and (ii) a speed range of the UE based on the one or more computed features, wherein the channel condition of the UE comprises LoS or NLoS; and determine a transmission configuration based on the channel condition of the UE and the speed range of the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8A illustrates a relationship between UE speed and an average time domain cross-correlation function of SRS channels, according to embodiments of the present disclosure;

DETAILED DESCRIPTION

Figure 1:
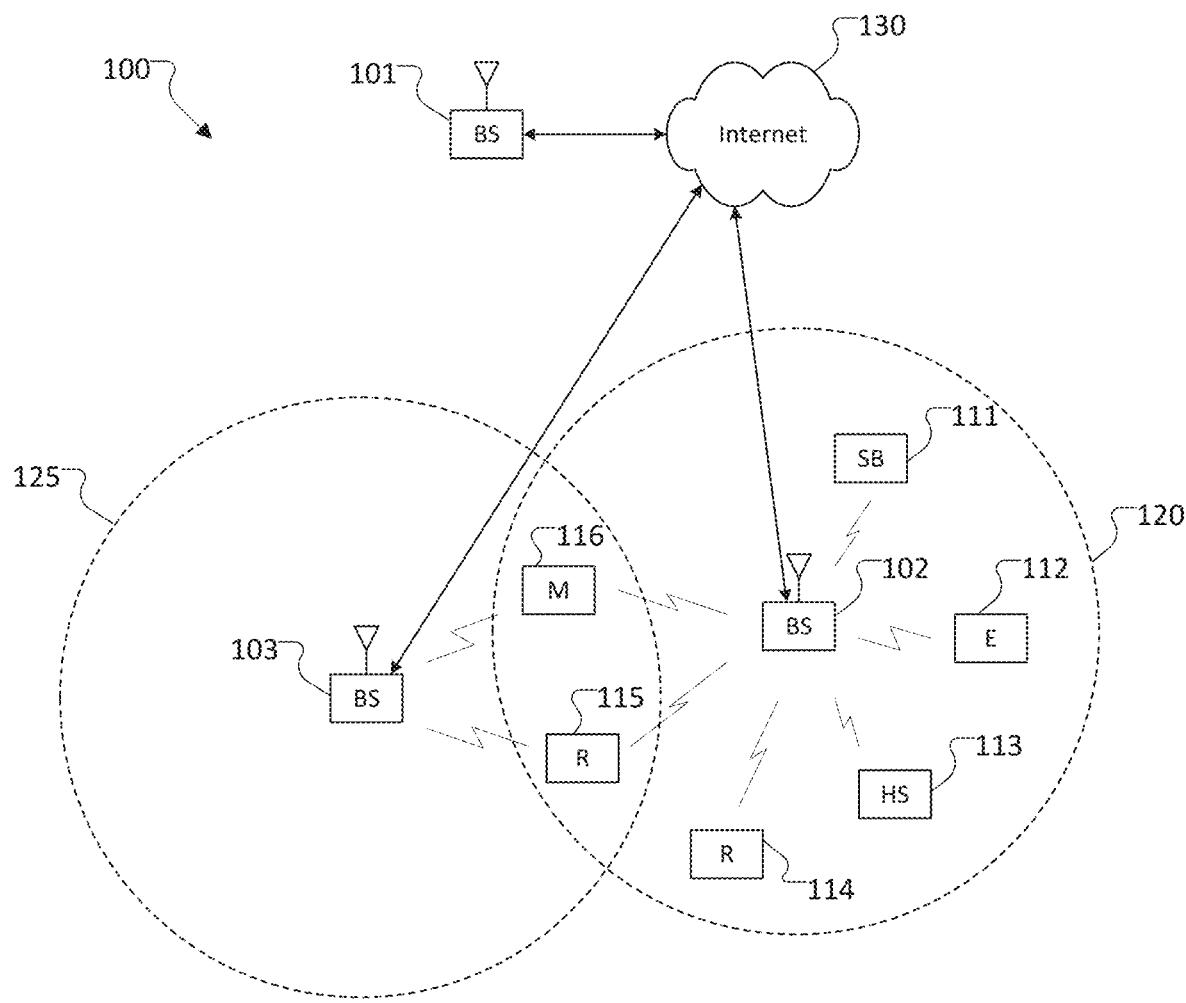
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for a low complexity machine learning based channel classifier. In certain embodiments, and one or more of the gNBs 101-103 includes circuitry, programming, or a combination thereof for a low complexity machine learning based channel classifier.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
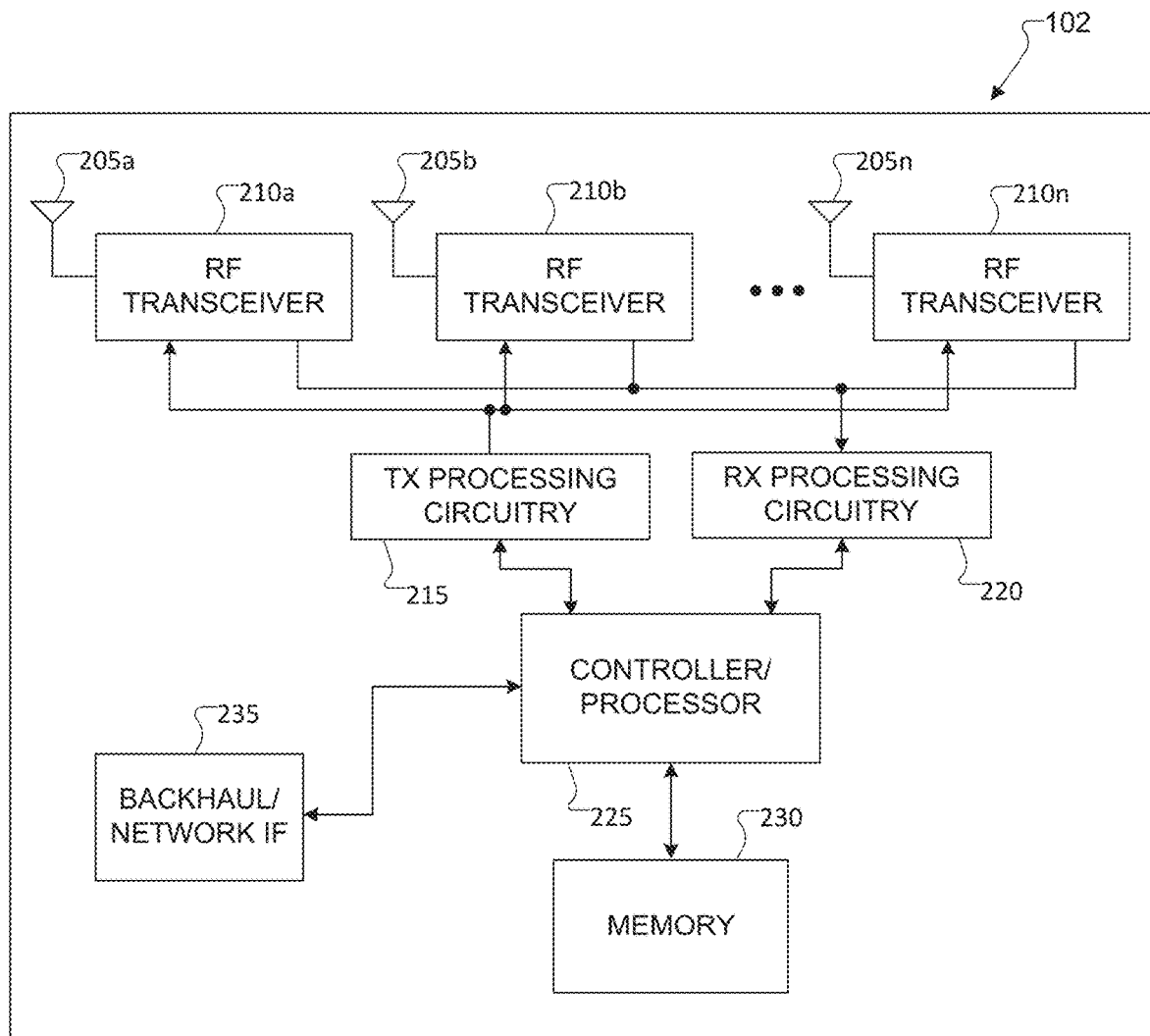
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support methods for a low complexity machine learning based channel classifier. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
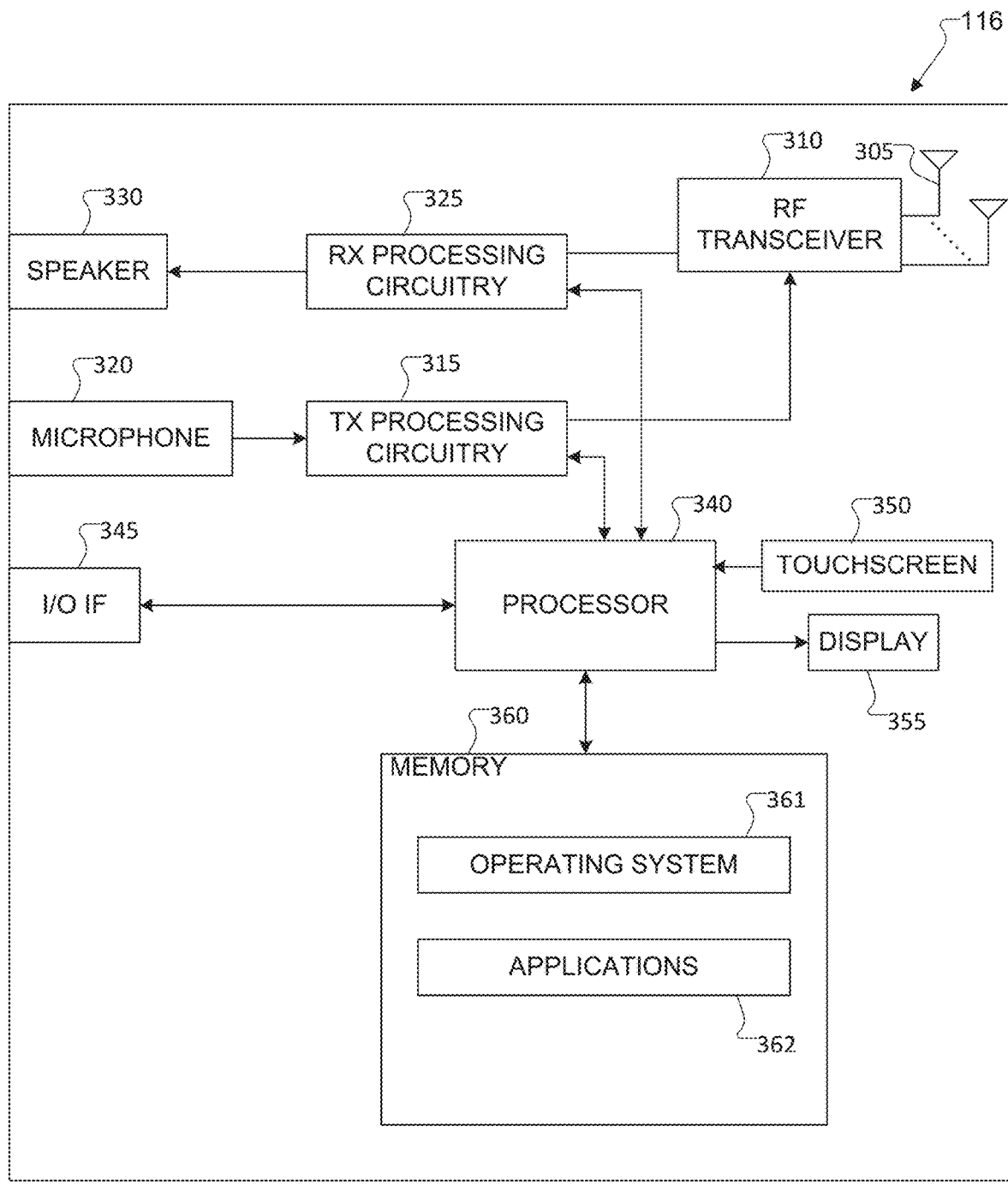
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a low complexity machine learning based channel classifier. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
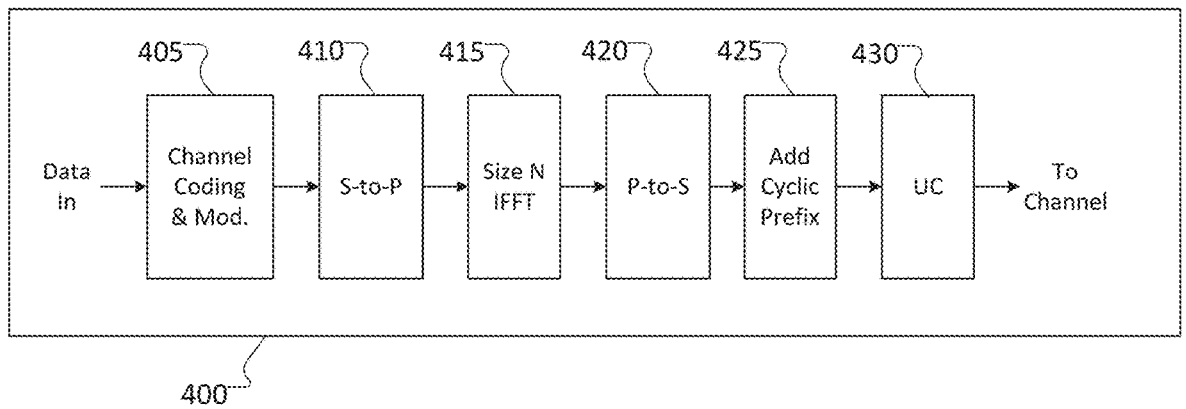
FIG. 4A illustrates a high-level diagram of an orthogonal frequency division multiple access transmit path according to embodiments of the present disclosure.
Figure 4B:
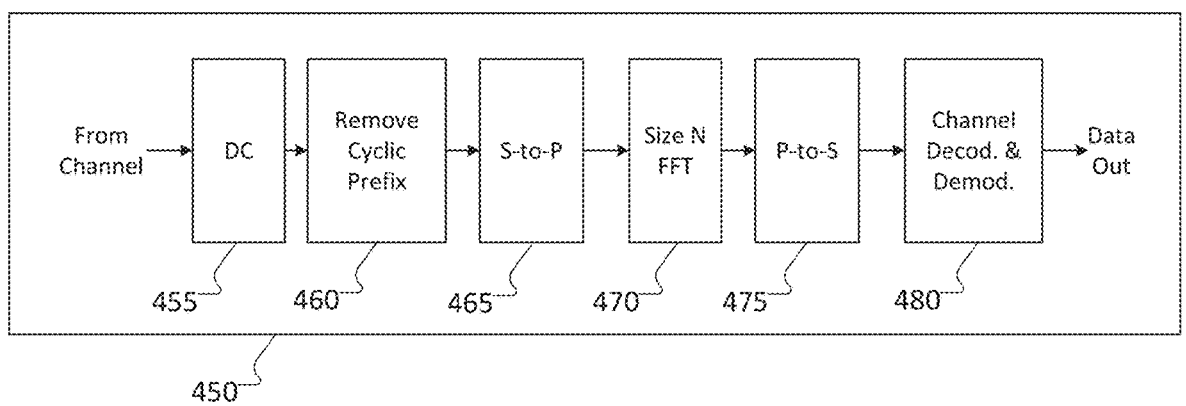
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the gNB 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of gNBs 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
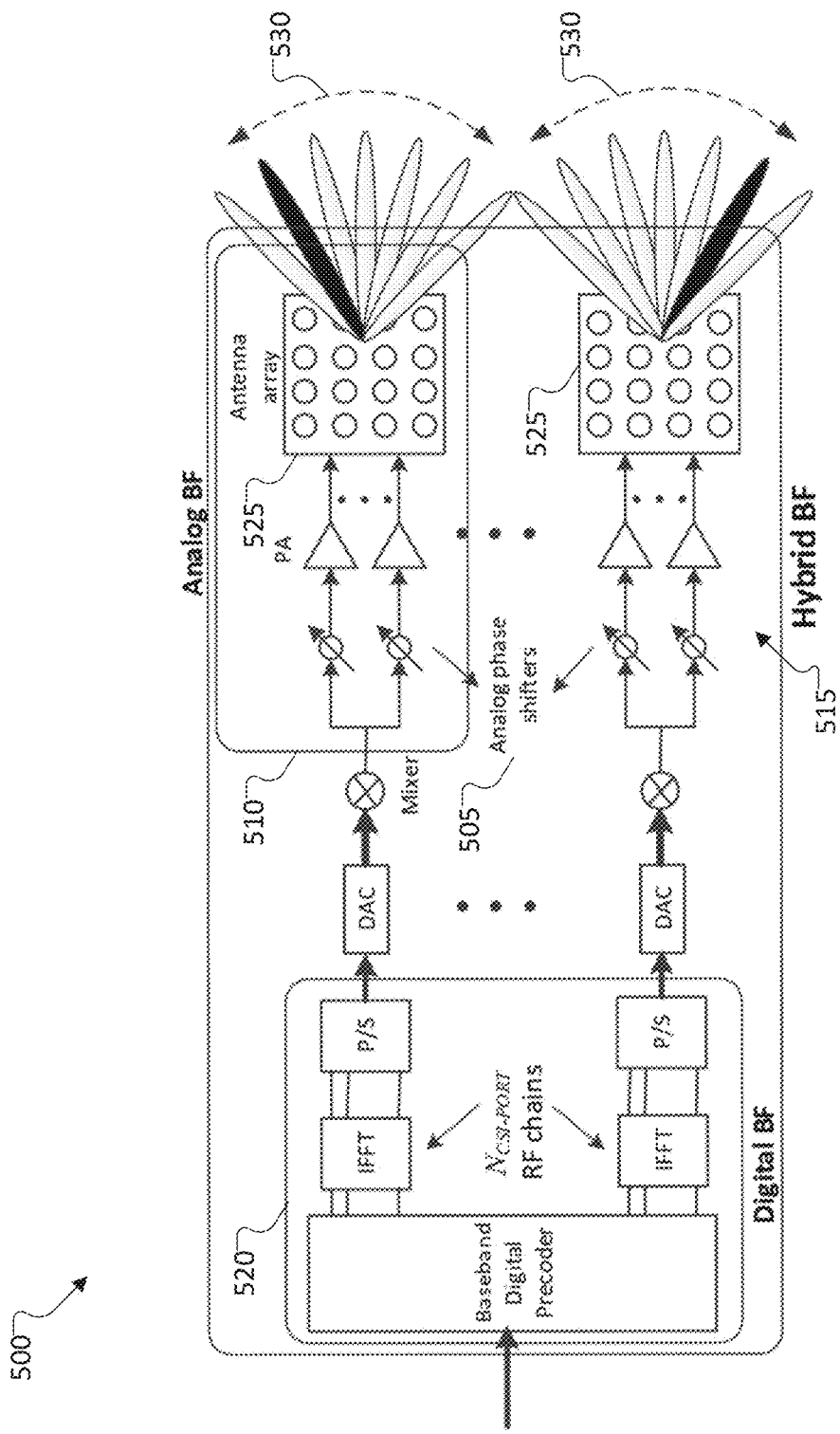
FIG. 5 illustrates an example beamforming architecture according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of gNB 102 or UE 116 can include the beamforming architecture 500. For example, one or more of antenna 205 and its associated systems or antenna 305 and its associated systems can be configured the same as or similar to the beamforming architecture 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency (~10 decibels (dB) additional loss @100 m distance), larger numbers of and sharper analog beams (hence larger number of radiators in the array) will be needed to compensate for the additional path loss.

Many features in noise reduction require knowledge about different characteristics of the radio channel. This may include rough knowledge of path loss for transmit power control, spatial information for CSI-RS transmissions, precise channel responses for multi-user MIMO (MU-MIMO) precoding, and the like. Furthermore, optimal selection and configuration of these schemes may also depend on a certain level of knowledge of the channel. For example, MU-MIMO is more sensitive to UE mobility than single-user MIMO (SU-MIMO); thus, by knowing a speed range of the UE, the gNB may decide an optimal transmission scheme to apply.

To address these and other issues, this disclosure provides a low complexity machine learning based channel classifier. As described in more detail below, the disclosed embodiments compute multiple features that are used to estimate the channel condition of the UE sending sounding reference signals (SRSs) to the gNB. The estimated channel condition of the UE includes whether the channel of the UE is a line-of-sight (LoS) channel or a non-line-of-sight (NLoS) channel). The estimated channel condition is then used to enable the gNB to adapt optimal transmission configurations, e.g., reference signal (RS) periodicity. In particular, in some embodiments, the disclosed embodiments can provide one or more features based on a time-domain cross-correlation function or a time-domain auto-correlation function of SRS channels.

Note that while some of the embodiments discussed below are described in the context of dynamic wireless systems in which one or more UEs are moving, these are merely examples. It will be understood that the principles of this disclosure may be implemented in any number of other suitable contexts or systems.

Figure 6:
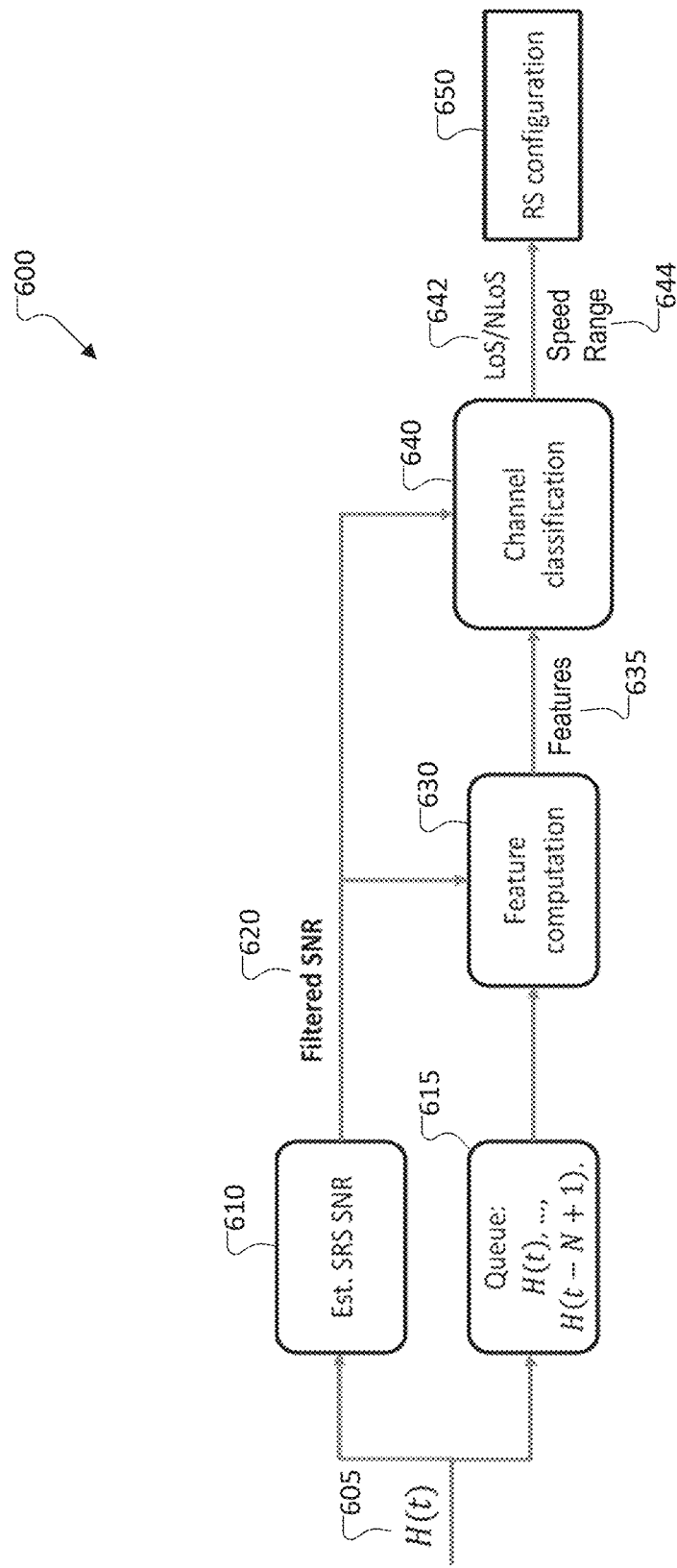
FIG. 6 illustrates an example process for performing low complexity channel classification according to embodiments of the present disclosure.

FIG. 6 illustrates an example process 600 for performing low complexity channel classification according to embodiments of the present disclosure. For ease of explanation, the process 600 will be described as being performed using the gNB 102 of FIG. 1; however, the process 600 could be performed by any other suitable device or system. The embodiment of the process 600 shown in FIG. 6 is for illustration only. Other embodiments of the process 600 could be used without departing from the scope of this disclosure.

As shown in FIG. 6, the gNB 102 receives multiple signals 605 (identified in FIG. 6 as H(t)) sent from one or more UEs 111-116. For ease of explanation, the process 600 will hereafter only reference the UE 116; however, it will be understood that other or additional UEs may be included in the process 600. In some embodiments, the signals 605 are SRS signals, which can be used to determine the channel condition between the gNB 102 and the UE 116. The UE 116 transmits the SRS signals 605 with periodicity T. In some embodiments, the SRS signals 605 are transmitted with a pre-configured frequency hopping pattern. In some embodiments, the SRS signals 605 are transmitted with no hopping (i.e., full-band). This can be viewed as a special case of frequency hopping.

The gNB 102 applies the received SRS signals 605 as input to a SRS SNR estimation operation 610. In the SRS SNR estimation operation 610, the gNB 102 uses the SRS signals 605 to estimate the SRS signal-to-noise ratio (SNR) of the channel between the gNB 102 and the UE 116. Herein, the SRS SNR is a representation of the signal quality of the SRS signals 605 sent from the UE 116 and received at the gNB 102. The SRS SNR estimation operation 610 also includes SNR filtering, in order to generate filtered SNR 620. The gNB 102 also stores the received SRS signals 605 in a queue 615. As shown in FIG. 6, the queue 615 can store the N most recently received SRS signals 605 from the UE 116.

After some of the SRS signals 605 are stored in the queue 615, the gNB 102 performs a feature computation operation 630. In the feature computation operation 630, the gNB 102 uses one or more of the SRS signals 605 in the queue 615 to compute one or more features 635. Some of the parameters for determining the features 635 are determined by the filtered SNR 620. The features 635 are later provided as inputs to a machine learning model that is used for channel classification, as discussed in greater detail below.

Figure 7:
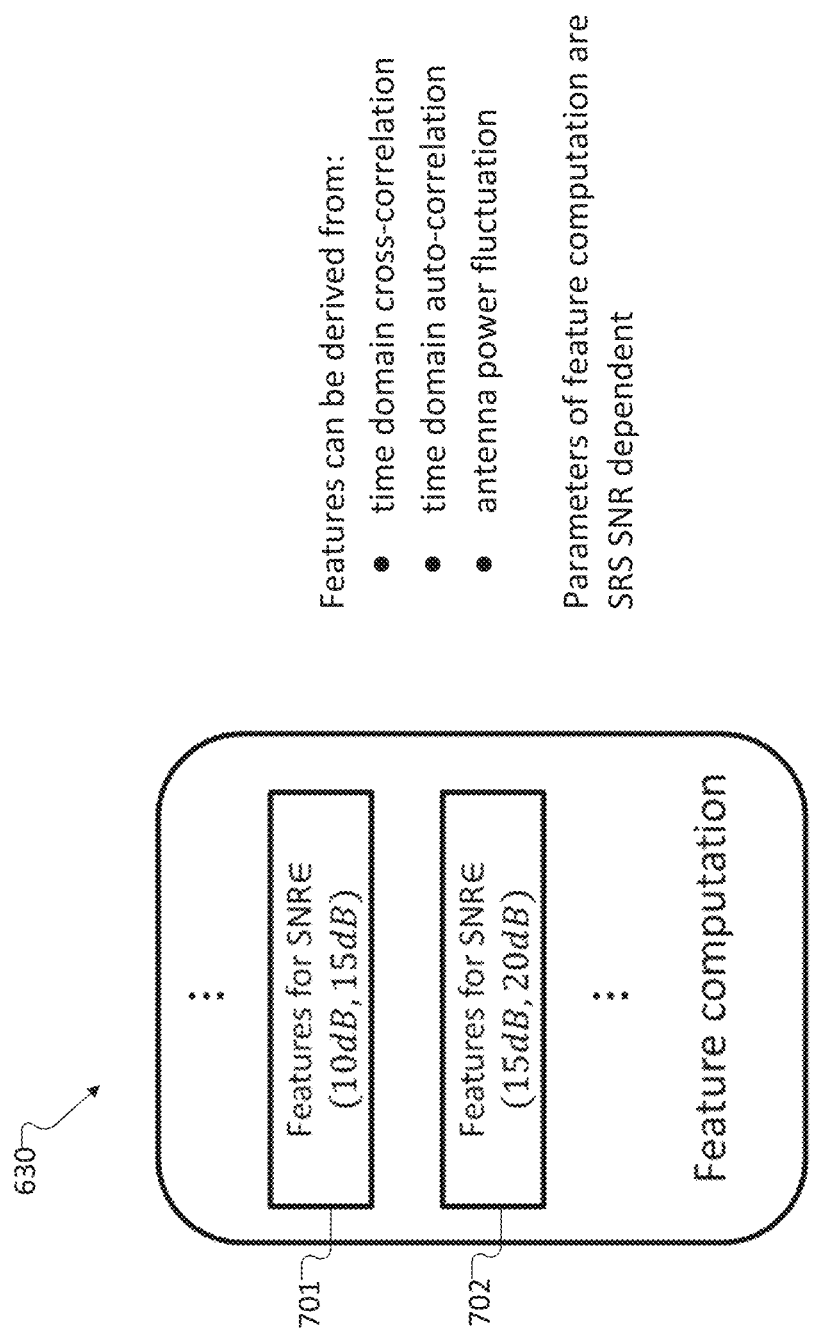
FIG. 7 illustrates further details of a feature computation operation performed in the process of FIG. 6, according to embodiments of the present disclosure.

FIG. 7 illustrates further details of the feature computation operation 630 according to embodiments of the present disclosure. As shown in FIG. 7, the gNB 102 computes the features 635 for different SNR levels 701-702. Each SNR level 701-702 represents a range of SNR levels. For example, the SNR level 701 may correspond to SNRs in a range of 10 dB-15 dB, while the SNR level 702 may correspond to the SNRs in a range of 15 dB-20 dB. While two SNR levels 701-702 are shown in FIG. 7, this is merely one example; other embodiments can include other numbers of SNR levels corresponding to different ranges of SNR values.

The gNB 102 computes the features 635 using one or more functions. In some embodiments, the gNB 102 derives the features 635 from (1) a time domain cross-correlation (TdXcorr) function of SRS channels, (2) a time domain auto-correlation (TdACF) function of SRS channels, (3) an antenna power fluctuation, or a combination of two or more of these. As discussed in greater detail below, the determination of the parameters of the feature computation operation 630 can take SRS SNR into account, which can result in improved performance.

Consider a 3GPP type of channel model where the gNB is equipped with K antennas, the UE has speed v, and P paths exist between the gNB and the UE. The channel coefficients between a UE antenna and the k-th gNB antenna on the m-th resource block (RB) at time instance t can be given by the following:

$$h_{k,m}(t) = \sum_{p=1..P} \gamma_{p,k} e^{-j2\pi m \Delta f \tau_p} e^{j2\pi vt\cos\theta_p},$$

where $\gamma_{p,k}$ is the complex weight of path p on the k-th gNB antenna including the array response, $\tau_p$ is the path delay, $\theta_p$ is the path angle on the UE side, and $\Delta f$ is the RB spacing.

The UE can be considered to be under LoS channel conditions or NLoS channel conditions. As used herein, LoS channel conditions occur when the communication paths between the gNB and the UE are substantially comprised of straight lines (i.e., lines of sight). That is, the signals between the gNB and the UE transmit primarily in a straight line. In contrast, NLoS conditions occur when the communication paths between the gNB and the UE involve some or substantial scattering. That is, some or all of the signals between the gNB and the UE reflect off of at least one object during transmission, thus not straight lines (i.e., non-line of sight).

Under LoS channel conditions, there presents a specular path 0, and the channel model can be written instead as:

$$h_{k,m}(t) = \sqrt{\frac{\kappa}{\kappa+1}} \gamma_{0,k} e^{-j2\pi m \Delta f \tau_0} e^{j2\pi vt\cos\theta_0} + \sqrt{\frac{1}{\kappa+1}} \sum_{p=1..P} \gamma_{p,k} e^{-j2\pi m \Delta f \tau_p} e^{j2\pi vt\cos\theta_p},$$

where the K-factor, $\kappa$, describes the LoS path strength. When $\kappa$ is large, the channel is close to a single-path, and when $\kappa=0$, the channel converges back to a NLoS channel.

According to the above notation, the channel coefficient vector on the gNB antenna array is therefore written as:

$$h_m(t) = [h_{1,m}(t), h_{2,m}(t), \ldots h_{K,m}(t)].$$

Based on the observations from lab measurements, the gNB-received SRS at time instance n with TO/FO impairments can be written as:

$$\tilde{h}_{m\in m_n}(nT) h_{m\in m_n}(nT) e^{j\phi_n} e^{-j2\pi m \Delta f t_n} + \sigma,$$

where $m_n$ represents the SRS transmitting RBs at the n'th SRS, $\phi_n$ denotes the random phase offset, $t_n$ denotes the random timing offset, and a represents the noise. These impairments are key challenges for designing classification methods for commercial systems.

On the gNB side, the available signaling reflecting a UE's channel condition includes the channel state information (CSI) report (which further includes the precoding matrix index (PMI), rank indicator (RI) and channel quality information (CQI)), and the SRS. The SRS contains the most sophisticated information about the channel. Therefore, it is useful to derive features from the SRS to classify the channel conditions.

The TdXcorr is defined as the magnitude of the correlation between two adjacent SRSs on the same sub-band over the antenna domain. Assuming there are S sub-bands to be hopped by the SRS, the TdXcorr on the m-th RB can be defined by the following:

$$TdXcorr_{m_n}(n) = E_m \left[ \frac{\left| \tilde{h}_{m\in m_n}(nT) \tilde{h}_{m\in m_n}^H((n+S)T) \right|}{\left| \tilde{h}_{m\in m_n}(nT) \right| \left| \tilde{h}_{m\in m_n}((n+S)T) \right|} \right] \approx$$

-continued $$\frac{\left| \sum_k \sum_p |\gamma_{p,k}|^2 e^{-j2\pi vST\cos\theta_p} \right| \left| e^{j(\phi_n - \phi_n + s)} e^{-j2\pi m \Delta f(t_n - t_{n+s})} \right|}{\left| \tilde{h}_{m\in m_n}(nT) \right| \left| \tilde{h}_{m\in m_n}((n+S)T) \right|},$$

where $\tilde{h}_m$ represents the SRS channel observed at the gNB 102, T represents the SRS period, p is the path index, k is the antenna index, $\gamma_{p,k}$ represents the complex channel gain, v represents the speed of the UE 116, and $\theta_p$ represents the direction of the UE 116.

Once the TdXcorr has been determined for each of the m RBs, the average TdXcorr can be determined by the following:

$$TdXcorr(n) \approx \frac{1}{|m_n|} \sum_{m \in m_n} TdXcorr_m(n)$$

where $m_n$ denotes the RB index set, and $|m_n|$ denotes the total number of RBs.

From the preceding equations, it can be observed that the TdXcorr is determined by the UE speed, path directions, path number and strength, and their separations. Also, the TdXcorr is affected by the noise on the denominator. The TdXcorr metric can be computed without knowledge of the SRS hopping pattern. The random timing and frequency offset does not change the amplitude, hence does not have impact on the TdXcorr.

Figure 8B:
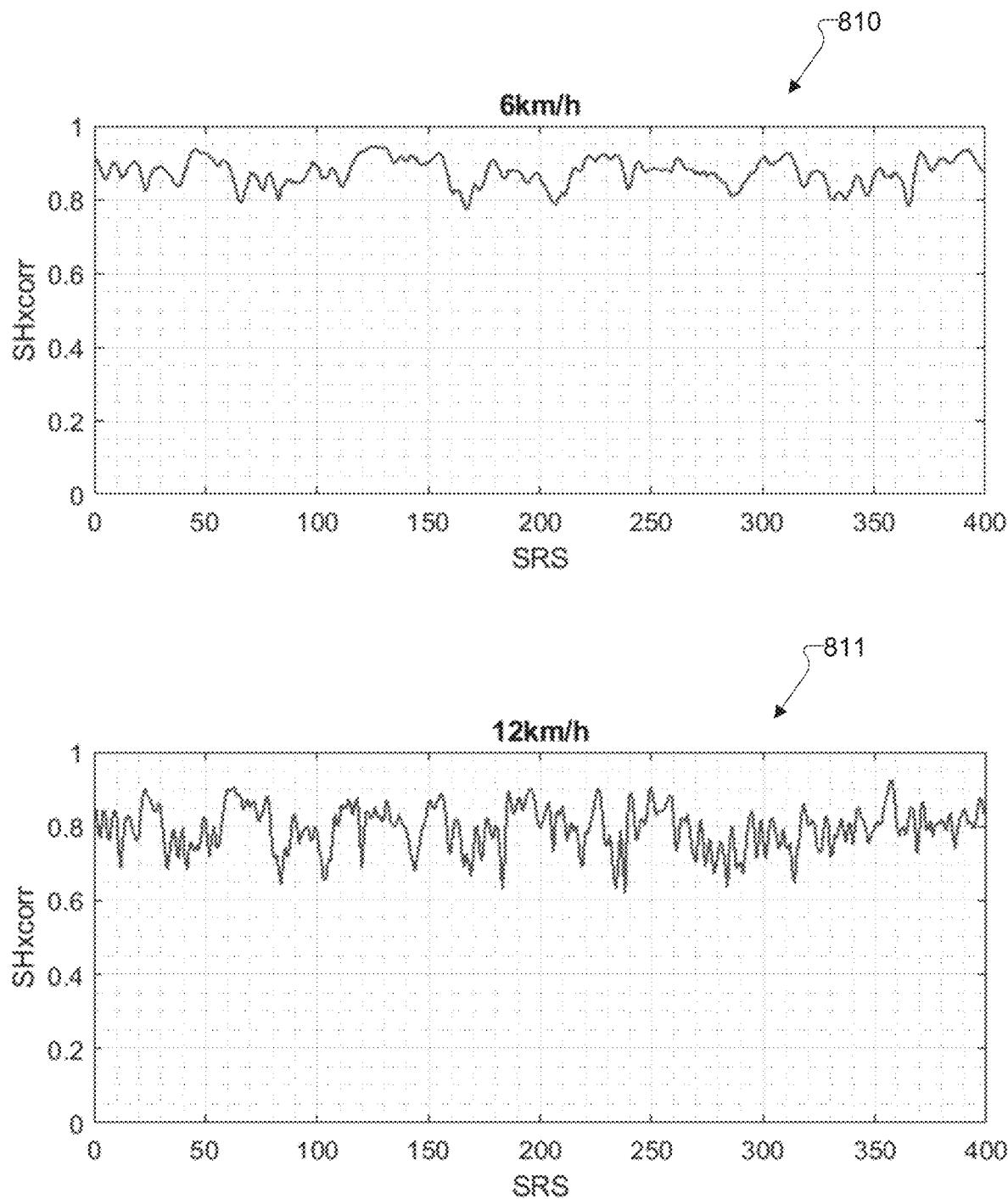
FIG. 8B illustrates a comparison of the time domain cross-correlation function for different UE speeds, according to embodiments of the present disclosure.

Therefore, the TdXcorr is a metric robust to the frequency hopping and TO/FO impairments. Given $\tilde{h}_{m\in m_n}(T), \ldots, \tilde{h}_{m\in m_n}(NT)$, the parameters TdXcorr(1), ..., TdXcorr(N−1) are computed. One example feature 635 derived from TdXcorr(n) is the average (or median) of TdXcorr(1), ..., TdXcorr(N−1). The relationship between the average of TdXcorr and UE speed is shown in FIG. 8A. In the chart 801, each vertical bar denotes UEs of one speed. Multiple (e.g., 570) UE channel profiles are simulated for each speed, according to the 3GPP channel model. The SNR is fixed at 10 dB, and the average window is 4s. As shown in FIG. 8A, the TdXcorr displays a downward trend as the UE speed increases, however the variance is large. Hence, the average TdXcorr feature 635 can aid in speed classification of the UE 116, although it may not be used by itself to determine the speed range of the UE 116. FIG. 8B shows two charts 810-811 illustrating a comparison of the average TdXcorr for different UE speeds. The chart 810 shows average TdXcorr for a UE 116 at 6 km/h, while the chart 811 show average TdXcorr for a UE 116 at 12 km/h. From the charts 810-811, it can be seen that a higher UE speed implies a lower average TdXcorr.

Intuitively, the frequency components describe how fast the TdXcorr changes over time, which is caused by the UE velocity projected onto different paths. When the UE speed is higher, it is expected to see the spectrum with larger frequency components. Therefore, the largest non-noise frequency component of TdXcorr can be selected as another feature 635.

For example, denote by TdXcorrFFT the FFT of the sequence TdXcorr(1), ..., TdXcorr(N−1), where TdXcorrFFT is a (N−1)×1 complex vector. Another example feature 635 derived from TdXcorr is the largest non-noise frequency component of TdXcorr, denoted by $N_{hf}$, which can be computed by the following:

$$N_{hf} = \max\left\{1, 2, \ldots, \left\lfloor\frac{N-1}{2}\right\rfloor\right\}$$

s.t. $\sum_{m=1}^{\lfloor\frac{N-1}{2}\rfloor} |TdXcorrFFT(m)| \times 1_{TdXcorrFFT(m)<TdXcorrFFT(N_{hf})}(m) \leq \alpha$, where $$1_A(x) = \begin{cases} 1 & \text{if } x \in A \\ 0 & \text{if } x \notin A \end{cases}$$

is the indicator function and $\alpha \in [0,1]$ is a pre-determined threshold.

Figure 8C:
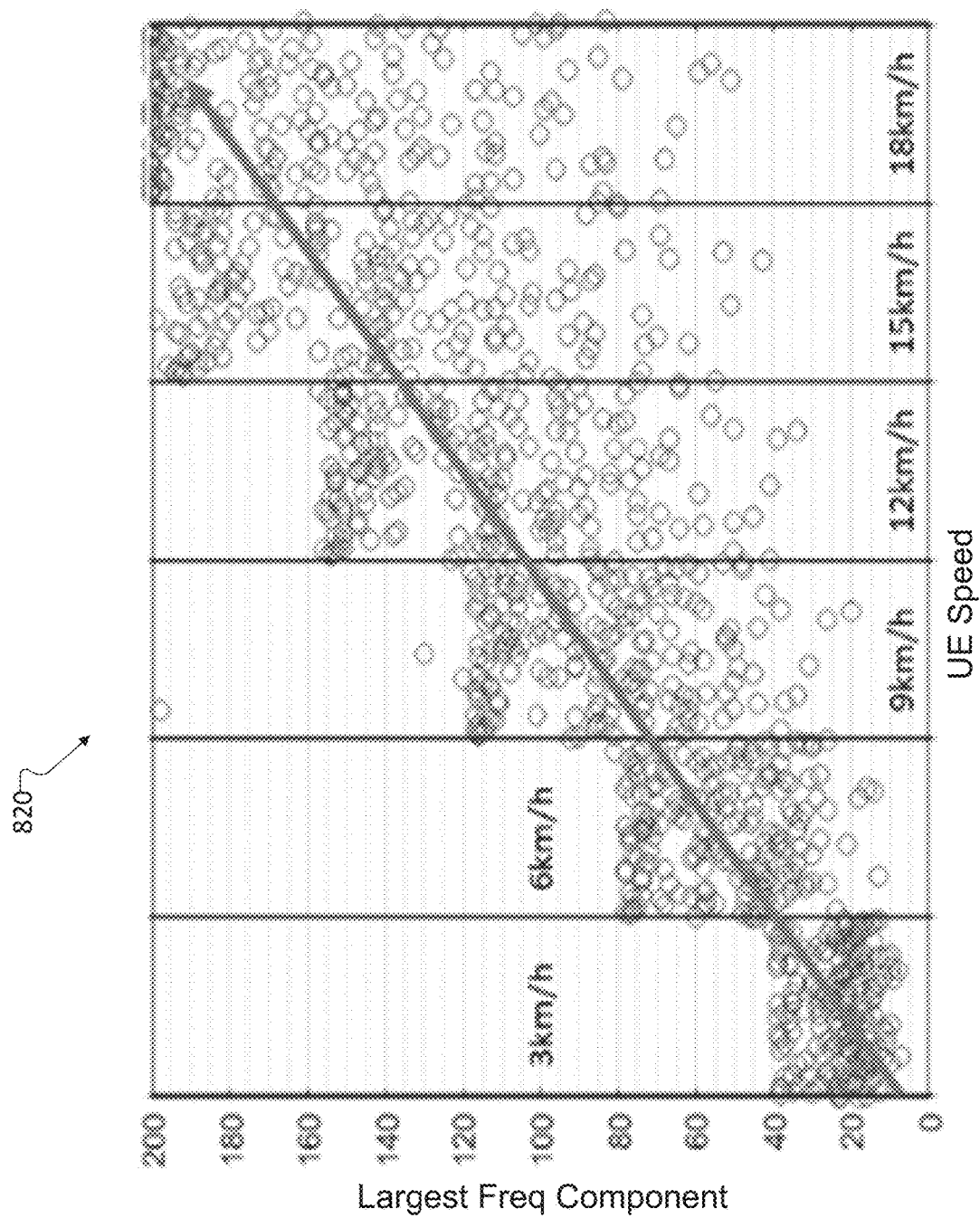
FIG. 8C illustrates a relationship between UE speed and a largest frequency component of the average time domain cross-correlation function of SRS channels, according to embodiments of the present disclosure.
Figure 8D:
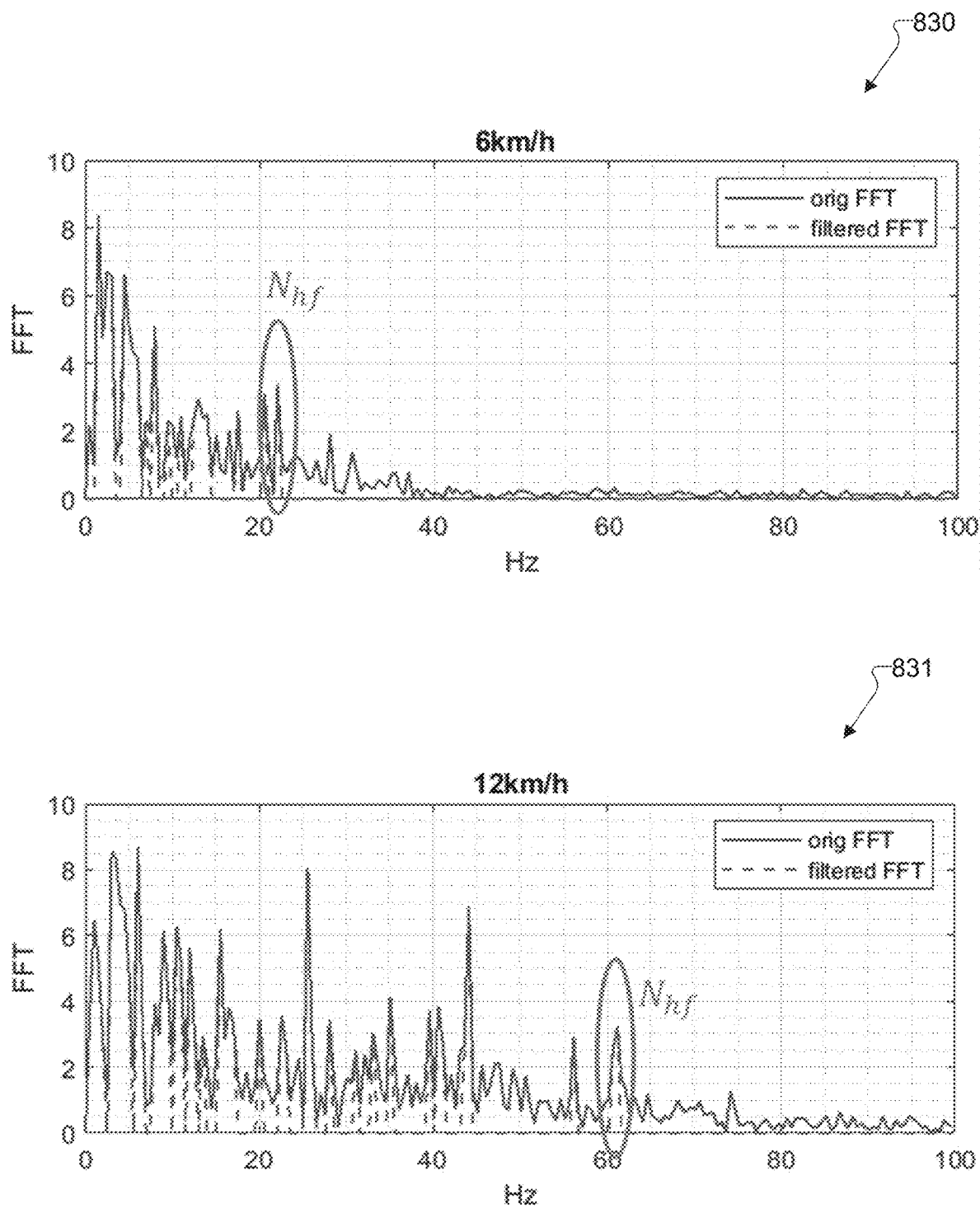
FIG. 8D illustrates a comparison of a largest frequency component of time domain cross-correlation function for different UE speeds, according to embodiments of the present disclosure.

Here, a depends on SRS SNR. The larger SRS SNR, the smaller a is. The relationship between $N_{hf}$ and the UE speed is shown in FIG. 8C. In the chart 820, each vertical bar denotes UEs of one speed. As shown in FIG. 8C, it can be seen that that the feature $N_{hf}$ increases as the UE speed increases. Again, this feature can aid in speed classification of the UE 116, but it may not be used by itself to determine the speed range of the UE 116 due to its large variance. FIG. 8D shows two charts 830-831 illustrating a comparison of $N_{hf}$ for different UE speeds. The chart 830 shows $N_{hf}$ for a UE 116 at 6 km/h, while the chart 831 show $N_{hf}$ for a UE 116 at 12 km/h. From the charts 830-831, it can be seen that a higher UE speed implies a larger $N_{hf}$.

As discussed above, another function from which one or more of the features 635 can be derived is the TdACF function. The TdACF of $h_{k,m}(t)$ is defined as $$R_{k,m}[\Delta n] = \frac{E[\tilde{h}_{k,m}^*(nT)\tilde{h}_{k,m}((n+\Delta nS)T)]}{E[\tilde{h}_{k,m}^*(nT)\tilde{h}_{k,m}(nT)]} \approx \frac{\sum_q \tilde{h}_{k,m}^*(qT)\tilde{h}_{k,m}((q+\Delta nS)T)}{\sum_q \tilde{h}_{k,m}^*(qT)\tilde{h}_{k,m}(qT)},$$

where $\Delta n \in [0, N-1]$ is a time offset, T denotes the SRS period, k is the antenna index, and m is the RB index. Denote by $$R[\Delta n] = \frac{1}{K|m_n|}\sum_{k=1}^{K}\sum_{m \in m_n} R_{k,m}[\Delta n]$$

is the average of $R_{k,m}[\Delta n]$ over RBs and gNB antennas.

Figure 8F:
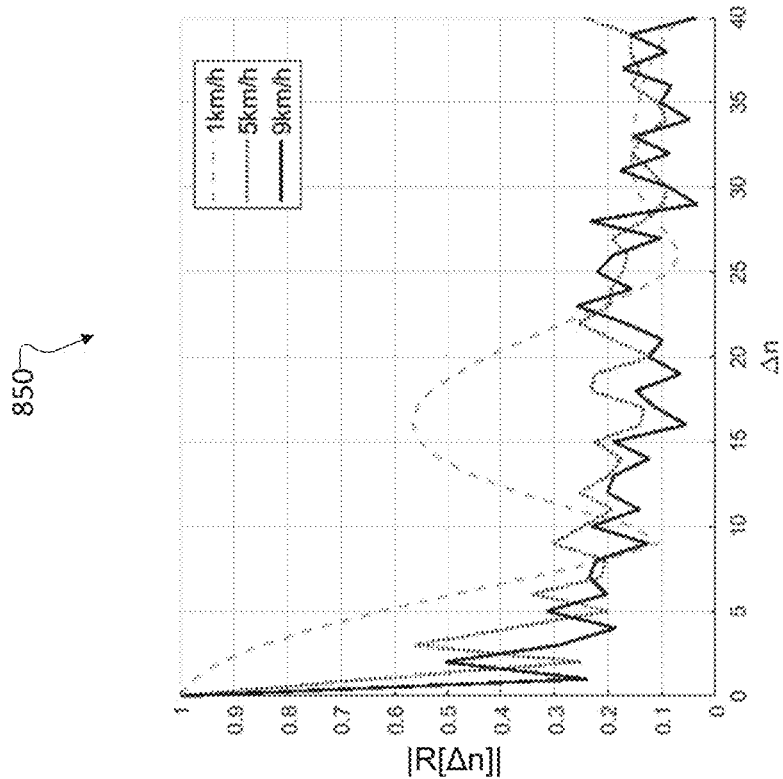
FIG. 8F illustrates absolute values of the time domain auto-correlation function for an example UE at different speeds, according to embodiments of the present disclosure.
Figure 8E:
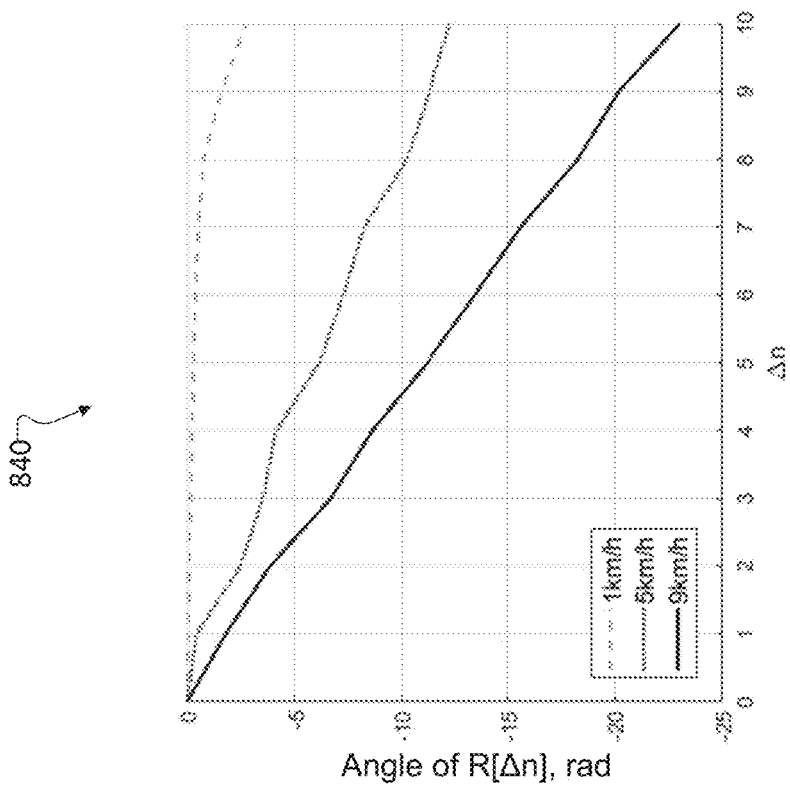
FIG. 8E illustrates values of angles of the time domain auto-correlation function for an example UE at different speeds, according to embodiments of the present disclosure.

One example feature 635 directly derived from TdACF is the absolute value of the angle of $R[\Delta n]$ denoted by $|\angle R[\Delta n]|$, which is the phase change rate between two SRSs in the same sub-band with $\Delta nT$ time difference. FIG. 8E shows a chart 840 illustrating the values of $\angle R[\Delta n]$ for an example UE 116 at different speeds, while FIG. 8F shows a chart 850 illustrating the values of $|R[\Delta n]|$ for an example UE 116 at different speeds. Additional features 635 can also be derived from the power spectral density (PSD) of SRS, which is defined as the FFT of TdACF. One example feature 635 derived from the PSD is the average (or median) of $$|F(R[\Delta n] - \bar{R})|, \text{ where}$$

$$\bar{R} = \frac{1}{N}\sum_{\Delta n=1}^{N-1} R(\Delta n).$$

Figure 8G:
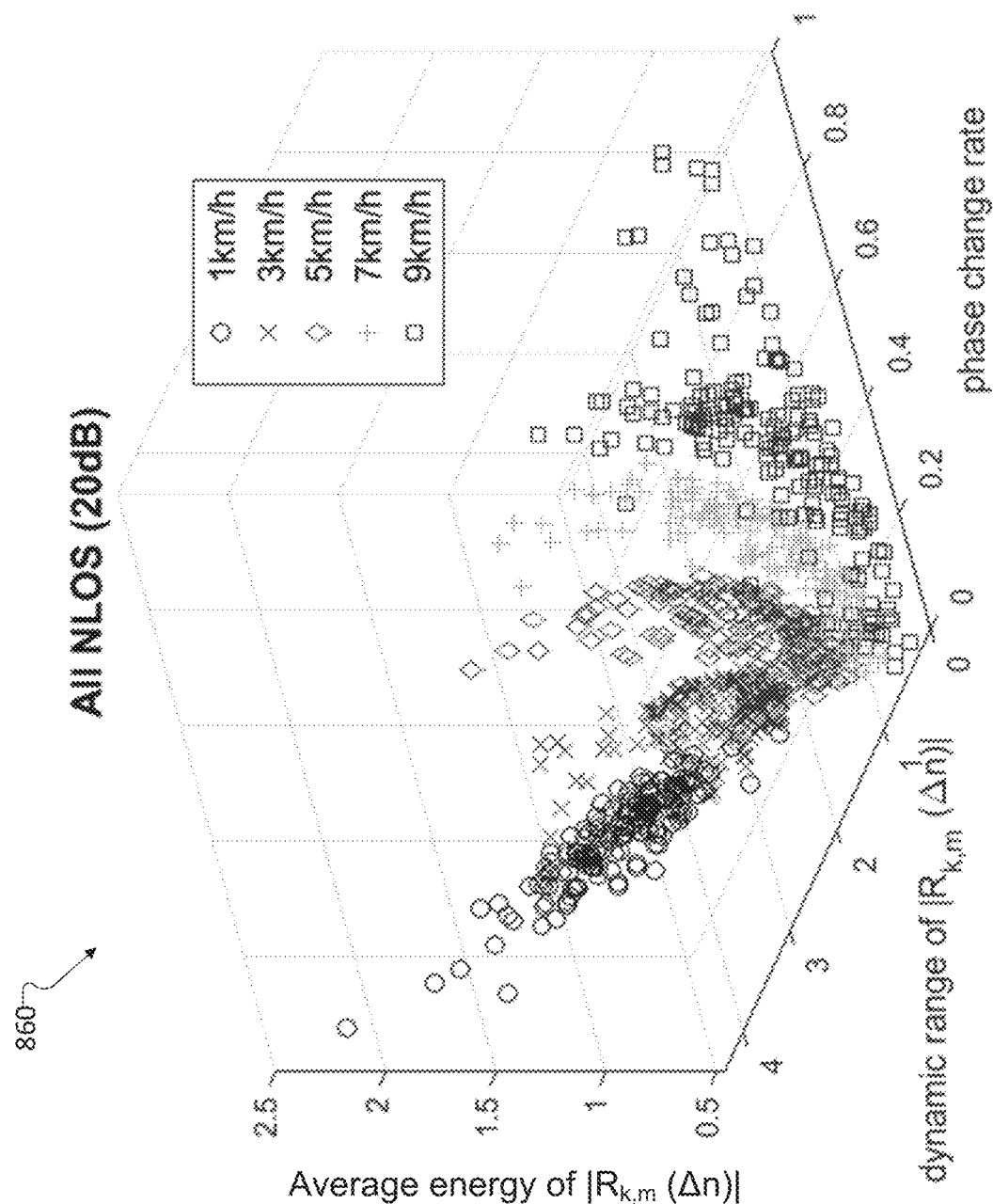
FIG. 8G illustrates synthetic channels of an example UE with different speeds given example features derived from the time domain auto-correlation function, according to embodiments of the present disclosure.

Another example feature 635 derived from the PSD is the standard deviation (or variance) of $|F(R[\Delta n]-\bar{R})|$. FIG. 8G shows a 3-D scatter plot 860 of synthetic channels of an example UE 116 with different speeds given the three example features 635 derived from $R_{k,m}[\Delta n]$. As shown in FIG. 8G, NLoS UEs with different speeds are clustered. Thus, speed range classification of the UE 116 is feasible with these features 635. For practical application purposes, it is desired to have one class covering a reasonable range of speed such that each class has distinct characteristics from other classes. Thus, classifiers can be built for limited number of classes with a reasonably large speed range in each class.

Figure 8H:
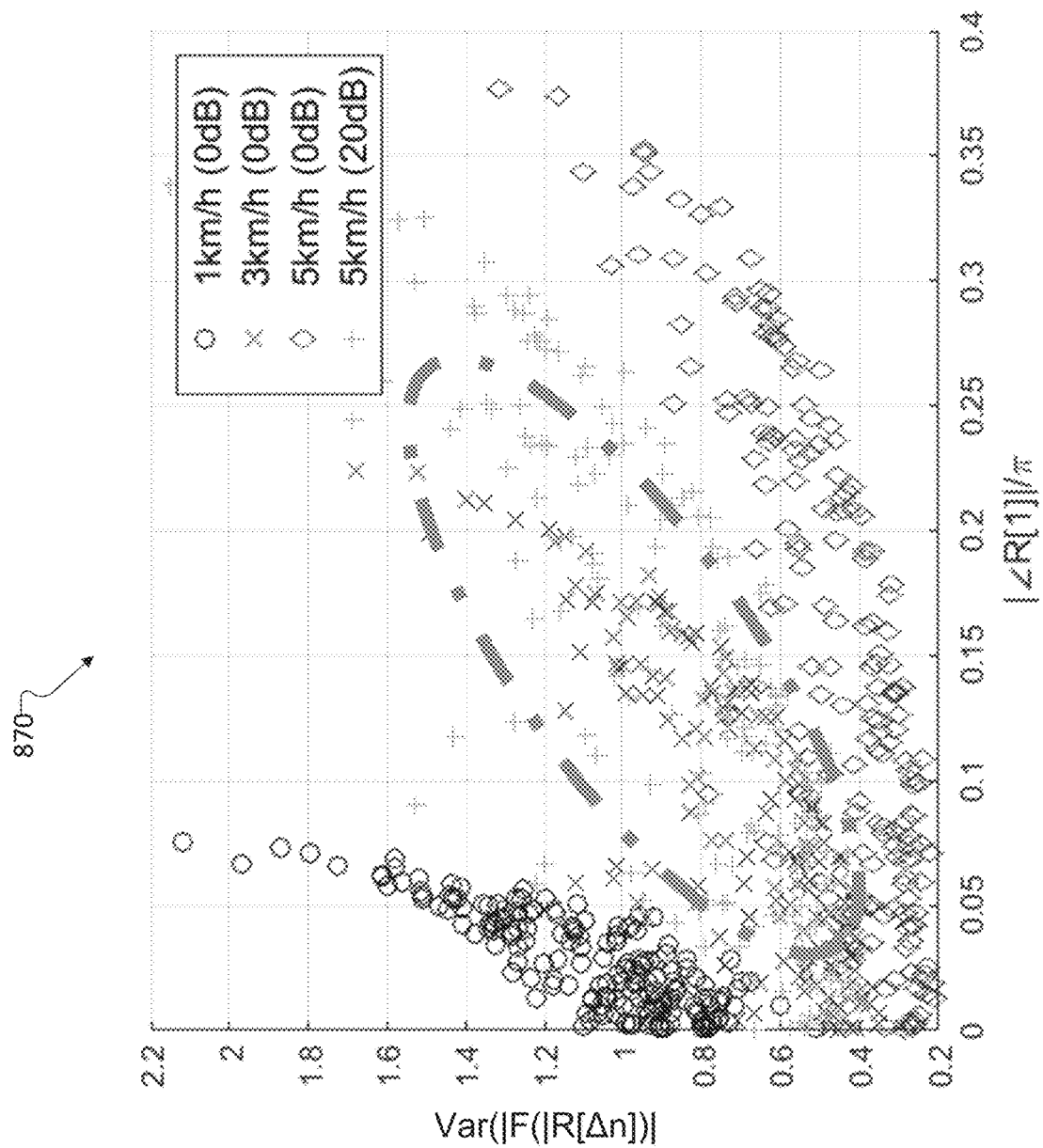
FIG. 8H illustrates features derived from the time domain auto-correlation function for example UEs at different speeds and different SRS SNR levels, according to embodiments of the present disclosure.
Figure 8I:
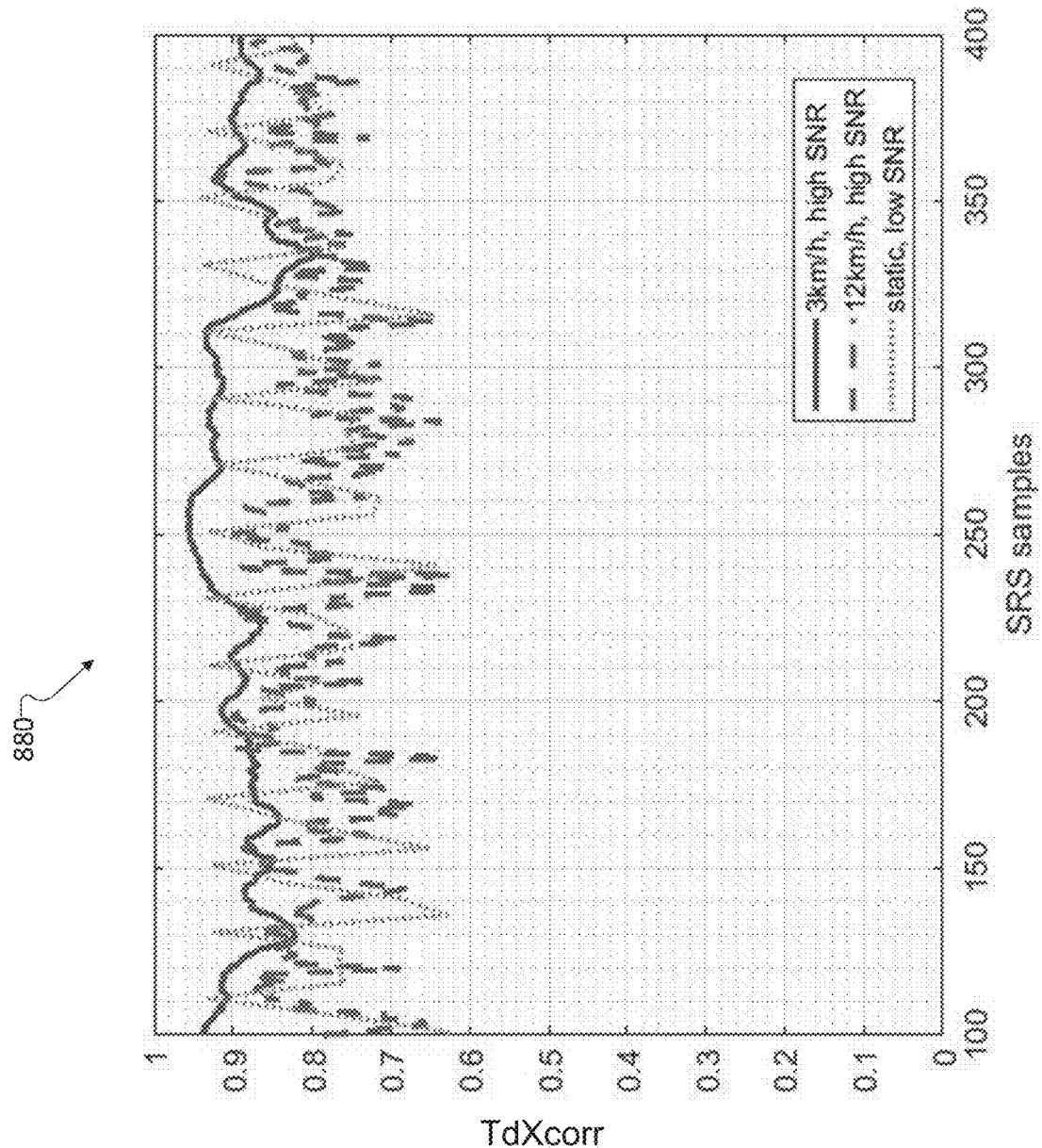
FIG. 8I illustrates features derived from the average time domain cross-correlation function for example UEs at different speeds and different SRS SNR levels, according to embodiments of the present disclosure.

Similarly, classifiers can be built for a small SRS SNR range. FIG. 8H shows a chart 870 illustrating features derived from TdACF for example UEs 116 at different speeds. As shown in FIG. 8H, given features derived from TdACF, UEs having a 3 km/h speed and SRS SNR=0 dB are overlapped with UEs having a 5 km/h speed and SRS SNR=20 dB. FIG. 8I shows a chart 880 illustrating features derived from TdXcorr for example UEs 116 at different speeds. As shown in FIG. 8I, given features derived from TdXcorr, high speed UEs given high SNR can have an average TdXcorr similar to that of low speed UEs given low SNR.

Feature Computation with Complexity Reduction.

In some embodiments, computing TdXcorr and TdACF for all RBs and all antennas can be too complex for typical hardware implementations, since a large number of inner products of vectors are needed whenever the SRS is updated. Several techniques to reduce the computational complexity by using a subset of RBs to compute TdXcorr and TdACF can be used, as will now be described.

1. For sub-band updated SRS, the gNB 102 can use SRSs on only one sub-band or a subset of sub-bands to compute TdXcorr and TdACF. For instance, the gNB 102 can use SRSs on a single sub-band (e.g., the first, second, third, or fourth sub-band), to compute TdXcorr and TdACF.
2. For both sub-band and full-band updated SRSs, the gNB 102 can down-sample the SRS on the frequency domain. In other words, the gNB 102 can select one RB every $X_1$ consecutive RBs to compute TdXcorr and TdACF, where $X_1$ is a configurable parameter (e.g., $X_1$=2, 4, 8, or any other suitable value). In general, $X_1$ can be smaller if SRS SNR is large.
3. For both sub-band and full-band updated SRS, the gNB 102 can also down-select RBs to compute TdXcorr and TdACF by other criterion. For example, the gNB 102 can check one or more power statistics of each RB and determine whether this RB should be selected. Given the power statistics of RB, the gNB 102 can either pick $X_1$ RBs with the largest/smallest power statistics or pick RBs with power statistics satisfying certain criterion. For example, the gNB 102 can pick RBs with power statistics greater than $X_2$, where $X_2$ is a predetermined threshold. In general, $X_1$ and $X_2$ are smaller if SRS SNR is lower. Examples of RB power statistics for computing TdXcorr include but are not limited to:
   a) the average power of $\tilde{h}_m(nT)$ and $\tilde{h}_m^H((n+S)T)$ for $m \in m_n$,
   b) the minimum power of $\tilde{h}_m(nT)$ and $\tilde{h}_m^H((n+S)T)$ for $m \in m_n$ and
   c) the maximum power of $\tilde{h}_m(nT)$ and $\tilde{h}_m^H((n+S)T)$ for $m \in m_n$.

Examples of RB power statistics for computing TdACF include but are not limited to:
   a) average power of $\{\Sigma_m|\tilde{h}_{k,m}(T)|^2, \ldots, \Sigma_k|\tilde{h}_{k,m}(NT)|^2\}$ for all $k \in \{1, \ldots, K\}$, b) minimum power of $\{\Sigma_m|\tilde{h}_{k,m}(T)|^2, \ldots, \Sigma_k|\tilde{h}_{k,m}(NT)|^2\}$ for all k∈{1, ..., K} and c) maximum power of $\{\Sigma_m|\tilde{h}_{k,m}(T)|^2, \ldots, \Sigma_k|\tilde{h}_{k,m}(NT)|^2\}$ for all k∈{1, ..., K}.

Complexity reduction can also be achieved by down-sampling in the antenna domain. A number of techniques are summarized as follows:

1. The gNB 102 can use SRS of a single polarization to compute TdXcorr and TdACF.
2. The gNB 102 can check one or more power statistics of each antenna and determine whether this antenna will be selected. Given the power statistics of antennas, the gNB 102 can either pick $Y_1$ antennas with the largest power statistics or pick antennas with power statistics satisfying certain criterion. For example, the gNB 102 can pick antennas with power statistics greater than $Y_2$, where $Y_2$ is a predetermined threshold. In general, $Y_1$ and $Y_2$ are smaller if SRS SNR is lower. Examples of antenna power statistics for computing TdXcorr include but are not limited to:
   a) the average power of $\Sigma_k|\tilde{h}_{k,m}(nT)|^2$ and $\Sigma_k|\tilde{h}_{k,m}((n+S)T)|^2$ for m∈$m_n$,
   b) the minimum power of $\Sigma_k|\tilde{h}_{k,m}((n-1)T)|^2$ and $\Sigma_k|\tilde{h}_{k,m}(nT)|^2$ for m∈$m_n$ and
   c) the maximum power of $\Sigma_k|\tilde{h}_{k,m}((n-1)T)|^2$ and $\Sigma_k|\tilde{h}_{k,m}(nT)|^2$ for m∈$m_n$.

Examples of antenna power statistics for computing TdACF include but are not limited to:
   a) average power of $\{\Sigma_m|\tilde{h}_{k,m}(T)|^2, \ldots, \Sigma_m|\tilde{h}_{k,m}(NT)|^2\}$ for all k∈{1, ..., K},
   b) minimum power of $\{\Sigma_m|\tilde{h}_{k,m}(T)|^2, \ldots, \Sigma_m|\tilde{h}_{k,m}(NT)|^2\}$ for all k∈{1, ..., K} and
   c) maximum power of $\{\Sigma_m|\tilde{h}_{k,m}(T)|^2, \ldots, \Sigma_m|\tilde{h}_{k,m}(NT)|^2\}$ for all k∈{1, ..., K}.

The selection of antennas can be from only one polarization or both polarizations.

The complexity reduction on the frequency domain and the antenna domain can be combined to achieve further complexity reduction. One example is to use a single sub-band and a single polarization of SRS to compute both TdXcorr and TdACF.

Antenna Power Computation.

The channel model of the m-th RB on the k-th antenna is given by the following:

$$h_{k,m}(t) = \sqrt{\frac{\kappa}{\kappa+1}} \gamma_{0,k} e^{-j2\pi m \Delta f \tau_0} e^{j2\pi v t \cos\theta_0} + \sqrt{\frac{1}{\kappa+1}} \sum_{p=1..P} \gamma_{p,k} e^{-j2\pi m \Delta f \tau_p} e^{j2\pi v t \cos\theta_p}$$

For LoS channels, the term $$\sqrt{\frac{\kappa}{\kappa+1}} \gamma_{0,k} e^{-j2\pi m \Delta f \tau_0} e^{j2\pi v t \cos\theta_0}$$

is dominant over other terms in $h_{k,m}(t)$. Hence, the power on different gNB antennas is more likely to share similar behavior. However, for NLoS channels, $h_{k,m}(t)$ does not have a dominant term, and the power on different gNB antennas is likely to diverge due to the multi-path superposition. Let the power of the k-th antenna be $p_k(nT)=\Sigma_{m\in m_n}|h_{k,m}(nT)|^2$. Denote by $\text{var}(p_{k\in\mathbb{K}}+(nT))$ and $\text{var}(p_{k\in\mathbb{K}}-(nT))$ the variances of antenna power given two different polarizations for the n-th SRS. Then one example of statistics related to power fluctuation is the medians of $\text{var}(p_{k\in\mathbb{K}}+(nT))$ and $\text{var}(p_{k\in\mathbb{K}}-(nT))$ for n∈{1, ..., N}. Define centered $p_k(nT)$ as $$\overline{p}_k(nT) = p_k(nT) - \bar{p}_k,$$

where $$\bar{p}_k = \frac{1}{N}\sum_{n=1}^{N} p_k((n+S)T).$$

Then the correlation matrix of centered power $\overline{p}_k(t)$ for a fixed antenna polarization can be given as:

$$corrMat = \begin{bmatrix} [\overline{p}_1(T), \ldots, \overline{p}_1(NT)] \\ \vdots \\ [\overline{p}_K(T), \ldots, \overline{p}_K(NT)] \end{bmatrix} \begin{bmatrix} [\overline{p}_1(T), \ldots, \overline{p}_1(NT)] \\ \vdots \\ [\overline{p}_K(T), \ldots, \overline{p}_K(NT)] \end{bmatrix}^T.$$

One example of statistics indicating whether power on different antennas track each other or not can be computed by $$\frac{1}{N^2}\sum_{i=1}^{N}\sum_{j=1}^{N} corrMat_{i,j} \text{ or }$$

$$\frac{1}{N(N-1)}\sum_{i=1}^{N}\sum_{j\neq i} corrMat_{i,j}.$$

Figure 8J:
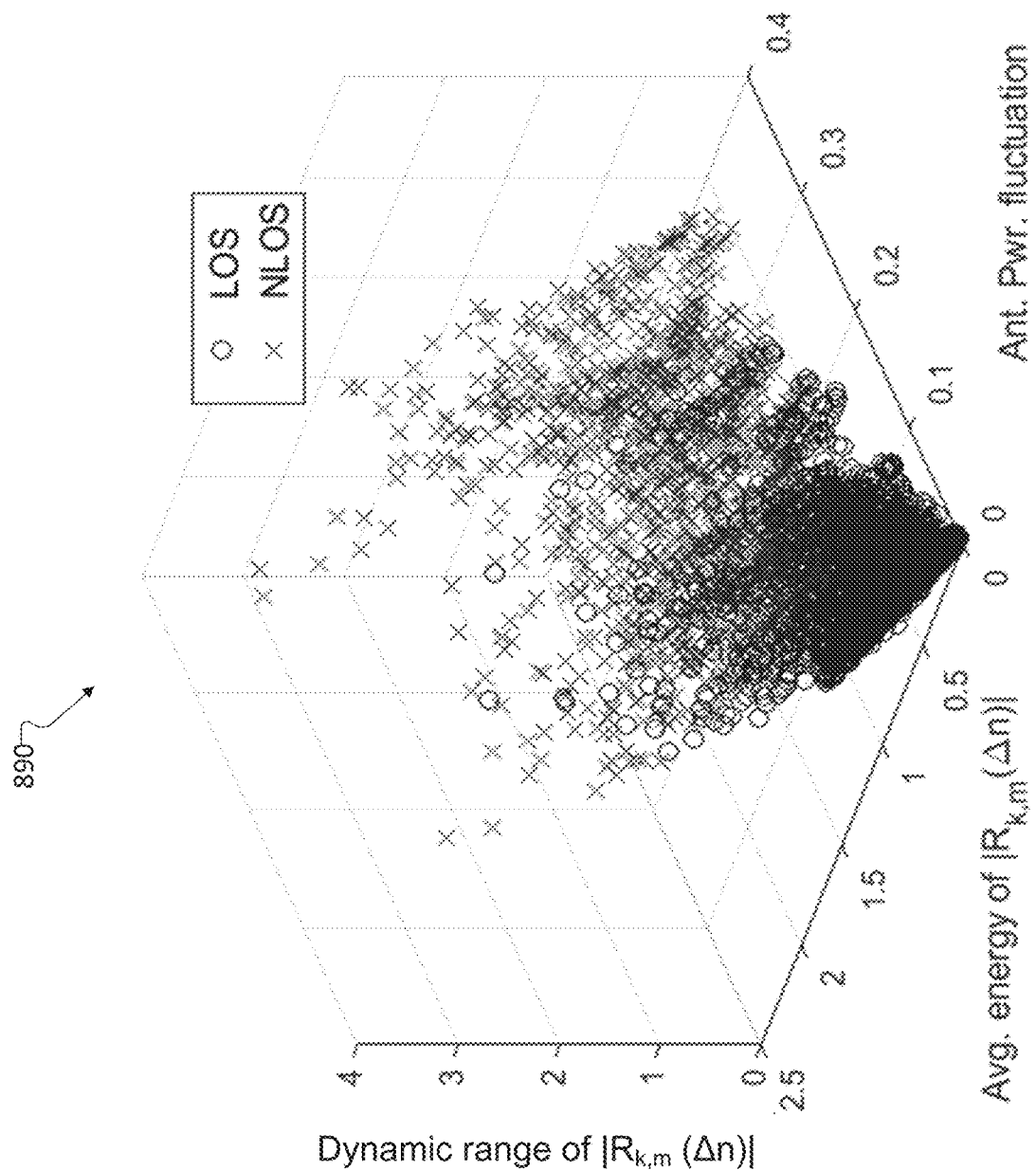
FIG. 8J illustrates LoS and NLoS channels given power fluctuation, according to embodiments of the present disclosure.

FIG. 8J shows a scatter plot 890 illustrating LoS and NLoS channels given power fluctuation, and features derived from TdACF. As shown in FIG. 8J, the LoS channels concentrate in the area close to the origin, while NLoS channels are farther away from the origin.

In some embodiments, the gNB 102 can use one of multiple techniques to reduce the complexity of computing antenna power fluctuation, as described below. In these techniques, the parameters $\mathbb{K}+$ and $\mathbb{K}-$ are defined as two sets containing all gNB antenna indices with polarization 1 and 2, respectively.

1. The gNB 102 only computes either $\text{var}(p_{k\in\mathbb{K}}+(nT))$ or $\text{var}(p_{k\in\mathbb{K}}-(nT))$. For example, if $\Sigma_{k\in\mathbb{K}}+p(nT) \gg \Sigma_{k\in\mathbb{K}}-p(nT)$, then the gNB 102 only computes $\text{var}(p_{k\in\mathbb{K}}+(nT))$ and sets $\text{var}(p_{k\in\mathbb{K}}-(nT))=\text{var}(p_{k\in\mathbb{K}}+(nT))$. If $\Sigma_{k\in\mathbb{K}}+p(nT) \ll \Sigma_{k\in\mathbb{K}}-p(nT)$, then the gNB 102 only computes $\text{var}(p_{k\in\mathbb{K}}-(nT))$ and sets $\text{var}(p_{k\in\mathbb{K}}+(nT))=\text{var}(p_{k\in\mathbb{K}}-(nT))$.
2. The gNB 102 down-samples $p_{k\in\mathbb{K}}\pm(T)$ in time and only uses the down-sampled $p_{k\in\mathbb{K}}\pm(nT)$ to compute var($p_{k\in\mathbb{K}}\pm(nT)$). For example, for sub-band updated SRS, the gNB 102 can only compute the antenna power when the SRS of the first, second, third, or fourth sub-band is updated.

Turning again to FIG. 6, after the features 635 are determined, the gNB 102 performs a channel classification operation 640 using the determined features 635. As shown in FIG. 6, the outputs of the channel classification operation 640 include a LoS/NLoS condition 642 of the UE 116 and a speed range 644 of the UE 116. Channel classification results are used to enable the gNB 102 to adapt optimal transmission configurations, e.g., reference signal (RS) periodicity.

Given the received SRS signals 605, the TdXcorr function, the TdACF function, and the power fluctuation on different antennas can be used for the channel classification operation 640. Additionally or alternatively, the features 635 derived from TdXcorr, TdACF and power fluctuation on different antennas can be used for the channel classification operation 640. By using the features 635 instead of raw TdXcorr, TdACF and power fluctuation on different antennas, the channel classification operation 640 can be performed using simpler machine learning (ML) tools. For example, the channel classification operation 640 can use one or more trained machine learning models, as described in greater detail below.

Figure 9:
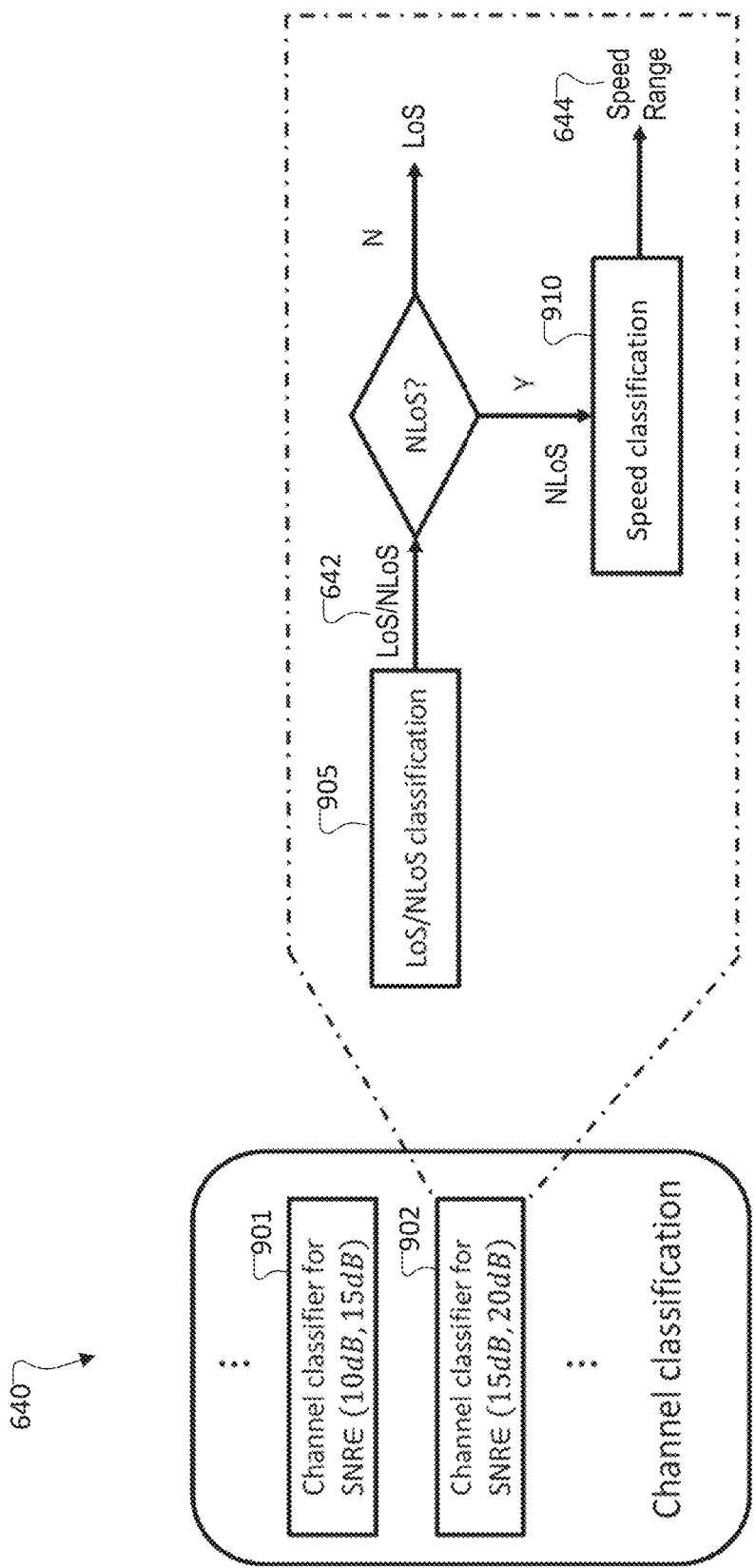
FIG. 9 illustrates further details of a channel classification operation performed in the process of FIG. 6, according to embodiments of the present disclosure.

FIG. 9 illustrates further details of the channel classification operation 640 according to embodiments of the present disclosure. As shown in FIG. 9, the channel classification operation 640 is a SRS SNR dependent hierarchical (multi-stage) structure for channel classification. That is, the gNB 102 performs multiple stages, where each stage classifies certain channel conditions, i.e., different SNR levels 901-902. Each SNR level 901-902 represents a range of SNR levels. For example, the SNR level 901 may correspond to SNRs in a range of 10 dB-15 dB, while the SNR level 902 may correspond to the SNRs in a range of 15 dB-20 dB. The use of multiple SNR levels promotes greater accuracy in the channel classification operation 640. While two SNR levels 901-902 are shown in FIG. 9, this is merely one example; other embodiments can include other numbers of SNR levels corresponding to different ranges of SNR values.

The channel classification operation 640 includes two parts: (1) a LoS/NLoS classification module 905, in which the gNB 102 classifies the channel condition of the UE, and (2) a speed classification module 910, in which the gNB 102 determines the speed range of the UE 116.

After the features 635 derived from TdXcorr, TdACF, and power fluctuation on different antennas are computed, the gNB 102 provides the features 635 as inputs into the LoS/NLoS classification module 905. The LoS/NLoS classification module 905 is a ML based classifier, such as random forest, support vector machine, k-nearest neighbors, or any other suitable ML classifier. The LoS/NLoS classification module 905 uses the features 635 to detect the channel condition of the UE 116. The LoS/NLoS classification module 905 outputs whether the UE 116 is a NLoS UE (i.e., the channels between the UE 116 and the gNB 102 are primarily NLoS channels) or a LoS UE (i.e., the channels between the UE 116 and the gNB 102 are primarily LoS channels). In general, NLoS channels pose more challenges to optimal transmission adaptation than do LoS channels, due to their rich multipath propagations.

If the UE 116 is determined to be a NLoS UE, then the gNB 102 provides the features 635 as inputs into the speed classification module 910. The speed classification module 910 is a ML based classifier, such as random forest, support vector machine, k-nearest neighbors, or any other suitable ML classifier. The speed classification module 910 uses the features 635 to detect the speed range 644 of the UE 116. Here, the speed range 644 of the UE 116 can indicate the movement speed of the UE 116 relative to the gNB 102 and can be expressed as a particular speed (e.g., 12 km/h) or a speed range (e.g., 12-15 km/h).

Once the LoS/NLoS condition 642 and the speed range 644 of the UE 116 are determined, the gNB 102 performs a transmission configuration operation 650 to determine a transmission configuration of the gNB 102. For example, in some embodiments, the gNB 102 can use the LoS/NLoS condition 642 and the speed range 644 of the UE 116 to determine an optimal periodicity of reference signals (RSs). Of course, other transmission configurations can be performed or determined at this time based on the LoS/NLoS condition 642 and the speed range 644 of the UE 116.

Although FIGS. 6 through 9 illustrate an example of a process 600 for performing low complexity channel classification and related details, various changes may be made to FIGS. 6 through 9. For example, various components in FIGS. 6 through 9 could be combined, further subdivided, or omitted and additional components could be added according to particular needs. In addition, various operations in FIGS. 6 through 9 could overlap, occur in parallel, occur in a different order, or occur any number of times.

Figure 10:
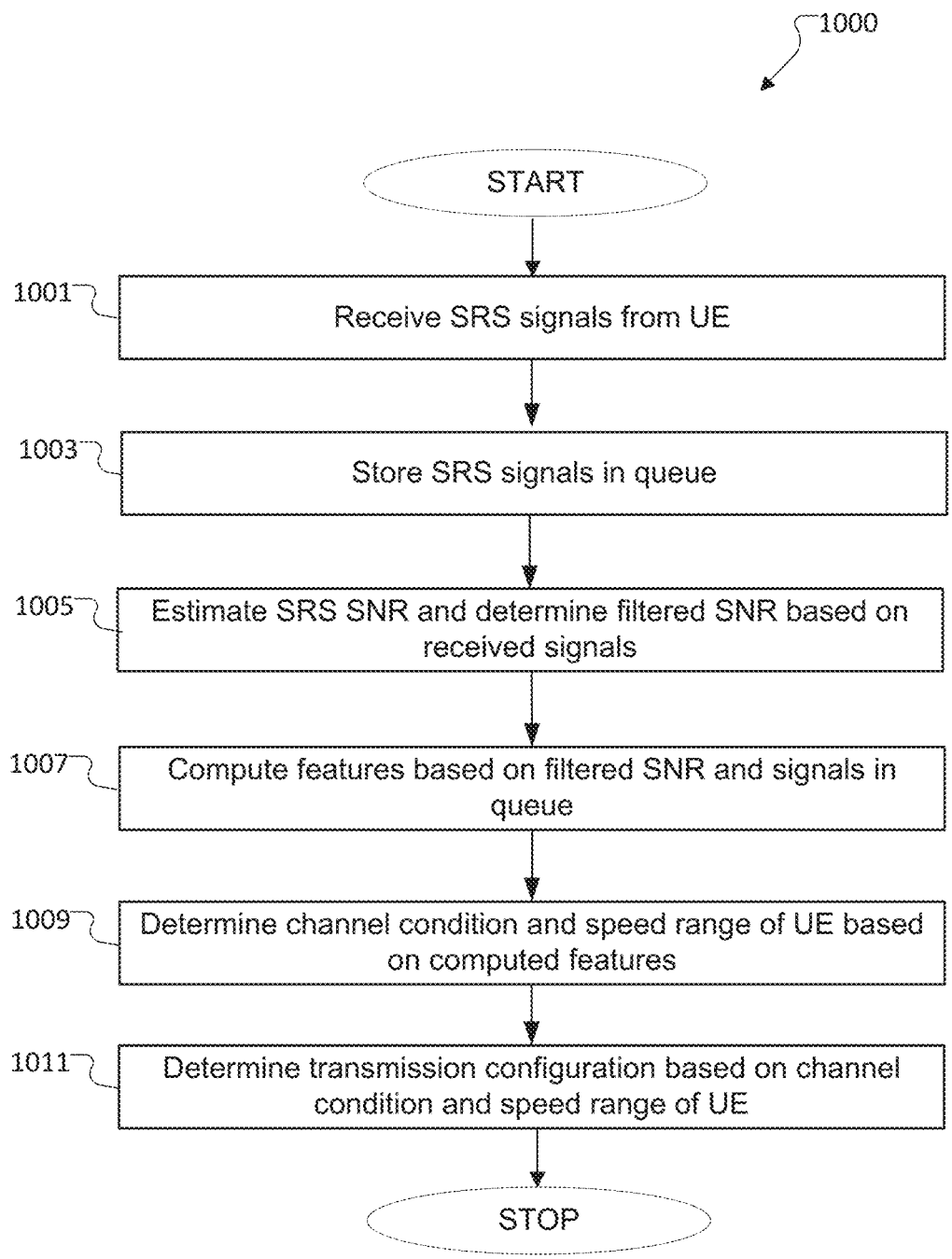
FIG. 10 illustrates a flow chart of a method for low complexity channel classification according to embodiments of the present disclosure.

FIG. 10 illustrates a flow chart of a method 1000 for low complexity channel classification according to embodiments of the present disclosure, as may be performed by one or more components of the network 100 (e.g., the gNB 102). The embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1001. At step 1001, the gNB 102 receives multiple signals from a UE. In some embodiments, the signals received from the UE include multiple sub-band SRSs, multiple full-band SRSs, or both. This could include, for example, the gNB 102 receiving multiple SRS signals 605 from the UE 116.

At step 1003, the gNB 102 stores the signals received from the UE in a queue. This could include, for example, the gNB 102 storing the SRS signals 605 in the queue 615.

At step 1005, the gNB 102 estimates a SRS SNR and determines a filtered SNR based on the received signals. This could include, for example, the gNB 102 performing the SRS SNR estimation operation 610 to estimate the SRS SNR of the channel between the gNB 102 and the UE 116, and to generate the filtered SNR 620.

At step 1007, the gNB 102 computes one or more features based on the filtered SNR and at least some of the received signals in the queue. In some embodiments, the features are computed for each of multiple SNR levels associated with the filtered SNR. In some embodiments, the features are computed based on at least one of: a time domain cross-correlation, a time domain auto-correlation, or an antenna power fluctuation. This could include, for example, the gNB 102 performing the feature computation operation 630 to compute the features 635 based on the filtered SNR 620 and the SRS signals in the queue 615.

At step 1009, the gNB 102 determines a channel condition and a speed range of the UE based on the one or more computed features. In some embodiments, the channel condition of the UE is either LoS or NLoS. In some embodiments, the channel condition of the UE and the speed range of the UE are determined for each of multiple SNR levels associated with the filtered SNR. This could include, for example, the gNB 102 performing the channel classification operation 640 to determine (i) the LoS/NLoS condition 642 of the UE 116 and (ii) the speed range 644 of the UE 116.

At step 1011, the gNB 102 determines a transmission configuration based on the channel condition of the UE and the speed range of the UE. This could include, for example, the gNB 102 performing the transmission configuration operation 650 to determine the periodicity of reference signals.

Although FIG. 10 illustrates one example of a method 1000 for low complexity channel classification, various changes may be made to FIG. 10. For example, while shown as a series of steps, various steps in FIG. 10 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
storing multiple signals received from a user equipment (UE) in a queue;
estimating a sounding reference signal (SRS) signal-to-noise-ratio (SNR) and determining a filtered SNR based on the received signals;
computing one or more features based on the filtered SNR and at least some of the received signals in the queue;
determining (i) a channel condition of the UE and (ii) a speed range of the UE based on the one or more computed features, wherein the channel condition of the UE comprises line-of-sight (LoS) or non-line-of-sight (NLoS); and
determining a transmission configuration based on the channel condition of the UE and the speed range of the UE.

2. The method of claim 1, wherein the multiple signals received from the UE comprise at least one of: multiple sub-band SRSs and multiple full-band SRSs.

3. The method of claim 1, wherein the one or more features are computed for each of multiple SNR levels associated with the filtered SNR.

4. The method of claim 1, wherein the channel condition of the UE and the speed range of the UE are determined for each of multiple SNR levels associated with the filtered SNR.

5. The method of claim 1, wherein the one or more features are computed based on at least one of: a time domain cross-correlation, a time domain auto-correlation, or an antenna power fluctuation.

6. The method of claim 5, wherein the one or more features comprise at least one of: an average time domain cross-correlation, a maximum non-noise frequency, a phase change rate of a channel, an average absolute value of a Fast Fourier Transform (FFT) of centered time domain auto-correlation, and a standard deviation of absolute value of the FFT of centered time domain auto-correlation.

7. The method of claim 5, wherein the time domain cross-correlation and the time domain auto-correlation are computed using one or more parameters that are selected based on (i) whether the multiple signals are sub-band SRSs or full-band SRSs, and (ii) the estimated SRS SNR.

8. The method of claim 7, wherein the time domain cross-correlation, the time domain auto-correlation, and the antenna power fluctuation are computed using at least one of a subset of frequencies and a subset of antennas, in order to reduce computation complexity.

9. The method of claim 8, wherein:
the subset of the frequencies is selected based on an average power, a minimum power, or a maximum power of SRSs on each of the frequencies; and
the subset of the antennas is selected based on an average power, a minimum power, or a maximum power of SRSs on each of the antennas.

10. The method of claim 1, wherein:
the multiple signals are received from the UE over time, and
the at least some of the received signals in the queue comprise a subset of the received signals that are most recently received from the UE.

11. A device comprising:
a transceiver configured to receive multiple signals from a user equipment (UE); and
a processor operably connected to the transceiver, the processor configured to:
store the received signals in a queue;
estimate a sounding reference signal (SRS) signal-to-noise-ratio (SNR) and determine a filtered SNR based on the received signals;
compute one or more features based on the filtered SNR and at least some of the received signals in the queue;
determine (i) a channel condition of the UE and (ii) a speed range of the UE based on the one or more computed features, wherein the channel condition of the UE comprises line-of-sight (LoS) or non-line-of-sight (NLoS); and
determine a transmission configuration based on the channel condition of the UE and the speed range of the UE.

12. The device of claim 11, wherein the multiple signals received from the UE comprise at least one of: multiple sub-band SRSs and multiple full-band SRSs.

13. The device of claim 11, wherein the processor is configured to compute the one or more features for each of multiple SNR levels associated with the filtered SNR.

14. The device of claim 11, wherein the processor is configured to determine the channel condition of the UE and the speed range of the UE for each of multiple SNR levels associated with the filtered SNR.

15. The device of claim 11, wherein the processor is configured to compute the one or more features based on at least one of: a time domain cross-correlation, a time domain auto-correlation, or an antenna power fluctuation.

16. The device of claim 15, wherein the one or more features comprise at least one of: an average time domain cross-correlation, a maximum non-noise frequency, a phase change rate of a channel, an average absolute value of a Fast Fourier Transform (FFT) of centered time domain auto-correlation, and a standard deviation of absolute value of the FFT of centered time domain auto-correlation.

17. The device of claim 15, wherein the processor is configured to compute the time domain cross-correlation and the time domain auto-correlation using one or more parameters that are selected based on (i) whether the multiple signals are sub-band SRSs or full-band SRSs, and (ii) the estimated SRS SNR.

18. The device of claim 17, wherein the processor is configured to compute the time domain cross-correlation, the time domain auto-correlation, and the antenna power fluctuation using at least one of a subset of frequencies and a subset of antennas, in order to reduce computation complexity.

19. The device of claim 18, wherein:
the processor is configured to select the subset of the frequencies based on an average power, a minimum power, or a maximum power of SRSs on each of the frequencies; and the processor is configured to select the subset of the antennas based on an average power, a minimum power, or a maximum power of SRSs on each of the antennas.

20. A non-transitory computer readable medium comprising program code that, when executed by a processor of a device, causes the device to:
- control a transceiver to receive multiple signals from a user equipment (UE);
- store the received signals in a queue;
- estimate a sounding reference signal (SRS) signal-to-noise-ratio (SNR) and determine a filtered SNR based on the received signals;
- compute one or more features based on the filtered SNR and at least some of the received signals in the queue;
- determine (i) a channel condition of the UE and (ii) a speed range of the UE based on the one or more computed features, wherein the channel condition of the UE comprises line-of-sight (LoS) or non-line-of-sight (NLoS); and
- determine a transmission configuration based on the channel condition of the UE and the speed range of the UE.

* * * * *